US012344949B2

(12) United States Patent
Rau

(10) Patent No.: US 12,344,949 B2
(45) Date of Patent: *Jul. 1, 2025

(54) METHOD AND SYSTEM FOR $CO_2$ EMISSION REDUCTION IN THE PRODUCTION OF CHEMICAL COMPOUNDS

(71) Applicant: Planetary Hydrogen Inc., Dartmouth (CA)

(72) Inventor: Gregory Hudson Rau, Castro Valley, CA (US)

(73) Assignee: PLANETARY TECHNOLOGIES INC., Gatineau (CA)

( * ) Notice: Subject to any disclaimer, the term of this patent is extended or adjusted under 35 U.S.C. 154(b) by 709 days.

This patent is subject to a terminal disclaimer.

(21) Appl. No.: 17/476,205

(22) Filed: Sep. 15, 2021

(65) Prior Publication Data

US 2022/0002889 A1 Jan. 6, 2022

Related U.S. Application Data

(63) Continuation-in-part of application No. 17/243,499, filed on Apr. 28, 2021.

(Continued)

(51) Int. Cl.
*C25B 15/08* (2006.01)
*B01D 53/62* (2006.01)
(Continued)

(52) U.S. Cl.
CPC ............ *C25B 15/081* (2021.01); *B01D 53/62* (2013.01); *B01D 53/80* (2013.01); *C01F 5/22* (2013.01);
(Continued)

(58) Field of Classification Search
CPC .... C25B 1/16; C25B 1/20; C25B 9/23; C25B 1/02; C25B 1/50; C25B 9/21; C25B 9/65;
(Continued)

(56) References Cited

U.S. PATENT DOCUMENTS 4,124,471 A 11/1978 Lieb et al.
4,197,421 A 4/1980 Steinberg
(Continued)

FOREIGN PATENT DOCUMENTS

CA 2682952 10/2008
CA 2786682 7/2011
(Continued)

OTHER PUBLICATIONS

Rau GH, Carroll SA, Bourcier WL, et al. Direct electrolytic dissolution of silicate minerals for air CO2 mitigation and carbon-negative H2 production. Proceedings of the National Academy of Sciences of the United States of America. Jun. 2013;110(25):10095-10100. DOI: 10.1073/pnas.1222358110.

(Continued)

*Primary Examiner* — Ciel P Contreras
(74) *Attorney, Agent, or Firm* — IP-MEX Inc.; Victoria Donnelly

(57) ABSTRACT

Method and system are disclosed for the production and use of a chemical compound, where a given amount of $CO_2$ is emitted in the production and the use, including producing a second chemical compound that is required for the production or the use of the first compound, where the production of the second compound consumes $CO_2$ and sequesters it from the atmosphere so that the total net $CO_2$ emitted in the production and use of the first compound is now reduced. In one embodiment, the second chemical compound is a negative-$CO_2$-emissions hydrogen, oxygen or chlorine gas produced in an electrolytic cell.

20 Claims, 12 Drawing Sheets

Related U.S. Application Data

(60) Provisional application No. 63/078,679, filed on Sep. 15, 2020, provisional application No. 63/017,230, filed on Apr. 29, 2020.

(51) Int. Cl.

| | | |
|---|---|---|
| *B01D 53/80* | (2006.01) | |
| *C01F 5/22* | (2006.01) | |
| *C01F 5/24* | (2006.01) | |
| *C25B 1/04* | (2021.01) | |
| *C25B 1/16* | (2006.01) | |
| *C25B 1/22* | (2006.01) | |
| *C25B 9/21* | (2021.01) | |
| *C25B 9/23* | (2021.01) | |

(52) U.S. Cl.
CPC .................. *C01F 5/24* (2013.01); *C25B 1/04* (2013.01); *C25B 1/16* (2013.01); *C25B 1/22* (2013.01); *C25B 9/21* (2021.01); *C25B 9/23* (2021.01); *B01D 2251/402* (2013.01); *B01D 2251/604* (2013.01); *B01D 2257/504* (2013.01); *B01D 2258/06* (2013.01)

(58) Field of Classification Search
CPC ... C25B 15/081; C25B 15/083; C25B 15/085; C25B 15/087; B01D 53/62; B01D 2257/504
See application file for complete search history.

(56) References Cited

U.S. PATENT DOCUMENTS

| | | | |
|---|---|---|---|
| 4,387,008 | A | 6/1983 | Winyall et al. |
| 4,707,234 | A | 11/1987 | Mori et al. |
| 5,386,838 | A | 2/1995 | Quincy, III et al. |
| 6,214,313 | B1 | 4/2001 | Berisko et al. |
| 7,604,787 | B2 | 10/2009 | Maroto-Valer et al. |
| 8,568,493 | B2 | 10/2013 | Cheiky et al. |
| 8,834,688 | B2 | 9/2014 | Gilliam et al. |
| 9,260,666 | B2 | 2/2016 | Aelion et al. |
| 9,359,268 | B2 | 6/2016 | Cheiky et al. |
| 10,113,407 | B2 | 10/2018 | Rau |
| 2005/0011770 | A1 | 1/2005 | Katsuyoshi et al. |
| 2005/0126923 | A1 | 6/2005 | Marsden et al. |
| 2006/0185985 | A1 | 8/2006 | Jones |
| 2009/0003240 | A1 | 1/2009 | Negron et al. |
| 2009/0169452 | A1 | 7/2009 | Constantz et al. |
| 2012/0183462 | A1 | 7/2012 | Rau |
| 2012/0291675 | A1 | 11/2012 | Camire et al. |
| 2016/0304787 | A1 | 10/2016 | Aelion et al. |
| 2016/0362800 | A1 | 12/2016 | Ren |
| 2017/0191173 | A1 | 7/2017 | Han et al. |
| 2020/0024757 | A1 | 1/2020 | Mani |

FOREIGN PATENT DOCUMENTS

| | | |
|---|---|---|
| CA | 2842940 | 1/2013 |
| JP | S61502525 | 11/1986 |
| JP | 2001334271 | 12/2001 |
| WO | 2008124538 | 10/2008 |
| WO | WO2019/172750 | 9/2019 |
| WO | 2021061213 | 4/2021 |

OTHER PUBLICATIONS

Heping Xie et al. CO2 mineralization of natural wollastonite into porous silica and CaCO3 powders promoted via membrane electrolysis, Environmental Earth Sciences (Feb. 17, 2018) 77:149.

J.E. Bennett "Electrodes for Generation of Hydrogen and Oxygen from Seawater", International Journal of Hydrogen Energy, v.5 pp. 401-408, 1980.

Jessica L. Hamilton, Siobhan A. Wilson; Bree Morgan, Anna L. Harrison, Connor C. Turvey, David J. Paterson, Gregory M. Dipple, Gordon Southam, "Accelerating Mineral Carbonation in Ultramafic Mine Tailings via Direct CO2 Reaction and Heap Leaching with Potential for Base Metal Enrichment and Recovery," Journal of Exonomic Geology (2020), 115(2): 303-323.

Tongyan Li, "The Study of CO2 Removal in Slurries with Mg(OH)2 Suspended Particles and the Regeneration of Products," Ph.D Dissertation, University of Cincinnati, Nov. 18, 2015.

Jenine Mccutcheon, Gregory M. Dipple, Siobhan A. Wilson, Gordon Southam, "Production of magnesium-rich solutions by acid leaching of chrysotile: A precursor to field-scale deployment of microbially enabled carbonate mineral precipitation," Journal of Chemical Geology, 413 (2015) 119-131.

Noah McQueen, Peter Kelemen, Greg Dipple, Phil Renforth, Jennifer Wilcox, "Ambient weathering of magnesium oxide for CO2 removal from air," Journal of Nature Communications, (2020) 11:3299.

Yoshihiko Sano, YiJia Hao, Fujio Kuwahara, "Development of an electrolysis based system to continuously recover magnesium from seawater," Heliyon Journal (Elsevier), (2018) 2405-8440.

Allan Scott, Christopher Oze, Vineet Shah, Nan Yang, Barney Shanks, Chris Cheeseman, Aaron Marshall, Matthew Watson, "Transformation of abundant magnesium silicate mineral for enhanced CO2 sequestration," Journal of Communications Earth & Environment, (2021) 2:25.

METHOD AND SYSTEM FOR $CO_2$ EMISSION REDUCTION IN THE PRODUCTION OF CHEMICAL COMPOUNDS

RELATED APPLICATIONS

The present application claims the benefit of the U.S. provisional patent application 63/078,679 filed on Sep. 15, 2020, entitled "Method of Reducing the Carbon Dioxide Emissions Intensity of Chemical Compounds";

the present application is also a Continuation-in-Part of U.S. patent application Ser. No. 17/243,499 filed on Apr. 28, 2021, entitled "Electrochemical System, Apparatus and Method to Generate Metal Hydroxide in the presence of Metal Silicates", which claims the benefit of the U.S. provisional patent application 63/017,230 filed on Apr. 29, 2020, entitled "Production of Hydrogen, Oxygen and Metal Hydroxide Using an Electrolyte produced from Metal Silicate", the entire contents of the above noted patent applications being incorporated by reference herein.

FIELD OF THE INVENTION

The present invention generally relates to the field of reducing $CO_2$ emissions associated with a chemical synthesis, refining and use of a chemical compound, including reducing $CO_2$ emissions in a reagent production required for the production of the chemical compound, including electrochemical methods of production of a negative-emissions reagent.

BACKGROUND OF THE INVENTION

Because human activities are increasing atmospheric $CO_2$ and, hence, impacting global climate change and ocean chemistry, methods of reducing $CO_2$ emissions to the atmosphere and reducing $CO_2$ concentrations in the atmosphere are being actively sought. Both the production and use of a broad range of chemical products presently contribute significantly to the preceding global $CO_2$ emissions. Primary among these is the massive production, refining and especially the use of hydrocarbon fuels. These include conventional gasoline, diesel, and natural gas derived from fossil sources. Previous methods of reducing these emissions include synthesizing these fuels from non-fossil carbon sources such as from biomass, the atmosphere or the ocean.

Alternatively, the fossil $CO_2$ emitted from the production and/or use of these compounds can be captured and sequestered so that they don't return to the atmosphere. These methods at best can only lower net fossil $CO_2$ emissions to zero, and may be costly and cumbersome to implement.

Therefore there is a need in the industry for developing additional or alternative methods for reducing net $CO_2$ emissions of fossil fuels.

SUMMARY OF THE INVENTION

There is an object of the present invention to provide a method and system for reducing net carbon dioxide ($CO_2$) emissions of chemicals metals and fuels by producing and using certain negative-emissions reagents in the refining, synthesis or use of those chemicals, metals and fuels.

That is, the atmospheric $CO_2$ consumed by the methods of the present invention in the generation of certain reagents can be used to offset the $CO_2$ emissions normally associated with the production and use of chemicals, metals and fuels when one or more of those reagents are used in such production or use.

According to one aspect of the invention, there is provided a method for reducing $CO_2$ emission in a production of a chemical compound or product during which a predetermined amount of $CO_2$ is emitted to the atmosphere, the method comprising:

selecting a reagent required for said production; and replacing the reagent with an equivalent reagent produced so that an amount of $CO_2$ emitted in the production of the chemical compound is smaller than the predetermined amount.

In the method, the production of the chemical compound or product comprises production and delivery of the reagent and synthesis, use and distribution of the chemical compound.

Preferably, the replacing comprises producing the reagent with a negative $CO_2$ emission.

In some embodiments of the invention, the reagent is selected from the group consisting of hydrogen ($H_2$), oxygen ($O_2$) and chlorine ($Cl_2$).

In some embodiments of the invention, the chemical compound is one containing hydrogen atoms; a chemical compound containing oxygen atoms; a chemical compound containing chlorine atoms; a chemical compound containing a reduced metal.

In the method described above, the chemical compound is selected from the group consisting of hydrocarbons, organic compounds, acids, ammonia, peroxide, and water. For example, the chemical compound may be selected from the group consisting of ammonia, peroxide, ethylene oxide, ethyl chloride, acrylic acid, methanol, and water.

In the method described above, the chemical compound is obtained, for example, by metal oxide smelting, oil refining, hydrogenation of margarine, or oxidation or partial oxidation of compounds.

In the method described above, the reagent is a gas produced in an electrochemical cell, wherein a metal hydroxide co-formed in the cell is contacted and reacted with carbon dioxide to form metal bicarbonate, metal carbonate or both, thereby sequestering the carbon dioxide from the atmosphere. In the embodiment of the invention, the gas is hydrogen, oxygen or chlorine gas.

In the method described above, the metal hydroxide contains metal ions from Group 1 through Group 6 elements of the periodic table.

In the method described above, the carbon dioxide is derived from one or more of the following: the atmosphere; biomass, soil or the ocean; a fossil source of the carbon dioxide.

According to another aspect of the invention, there is provided a system for reducing carbon dioxide emission, comprising:

means for production of a chemical compound, during which a predetermined amount of carbon dioxide is emitted, the chemical compound requiring a reagent for said production;

means for producing the reagent so that an amount of carbon dioxide emitted in the production of the chemical compound is smaller than the predetermined amount.

In the system described above, the means for the production of the chemical compound comprises means for the production and delivery of the reagent, and means for the synthesis, use and distribution of the chemical compound.

In the system described above, preferably, the reagent is produced with a negative $CO_2$ emission.

In the system described above, the reagent is selected from the group consisting of $H_2$, $O_2$ and $Cl_2$.

In the system described above, the chemical compound is one of a chemical compound containing hydrogen atoms; a chemical compound containing oxygen atoms; a chemical compound containing chlorine atoms; a chemical compound containing a reduced metal.

In the system described above, the chemical compound is selected from the group consisting of hydrocarbons, organic compounds, acids, ammonia, peroxide, and water. For example, the chemical compound may be selected from the group consisting of ammonia, peroxide, ethylene oxide, ethyl chloride, acrylic acid, methanol, and water.

In the system described above, the chemical compound is obtained by a process selected from the group consisting of metal oxide smelting, oil refining, hydrogenation of margarine, and oxidation or partial oxidation of compounds.

In the system described above, the reagent is a gas produced in an electrochemical cell, wherein a metal hydroxide co-formed in the cell is contacted and reacted with carbon dioxide to form one or more of the metal bicarbonate and the metal carbonate, thereby sequestering the carbon dioxide from the atmosphere. In the embodiment of the invention, the gas is hydrogen, oxygen or chlorine gas.

In the system described above, the metal hydroxide contains metal ions from Group 1 through Group 6 elements of the periodic table.

In the system described above, the carbon dioxide is derived from one or more of the following: the atmosphere; biomass, soil or the ocean; a fossil source of the carbon dioxide.

According to yet another aspect of the invention, there is provided a method for reducing $CO_2$ emissions in a production and use of a chemical compound using gas as a reagent, wherein a predetermined amount of $CO_2$ is emitted to the atmosphere during the production and the use of the chemical compound, the method comprising:

substituting the gas with a negative carbon emission gas for reducing the predetermined amount of $CO_2$ emissions;

the negative carbon emission gas being produced by the following steps:

(a) supplying a direct current from an electrical source at a predetermined voltage to an electrolytic container having an anode, a cathode, an electrolyte solution comprising a metal salt, an anode region adapted to generate an oxidative gas and an acidic solution, and a cathode region adapted to generate hydrogen gas and a dissolved metal hydroxide solution, the metal in said dissolved metal hydroxide solution being derived from the metal salt of the electrolyte solution;

(b) supplying, from a source disposed externally to the electrolytic container, a metal silicate soluble in the acidic solution;

(c) removing the acidic solution from the anode region to another container outside the electrolytic container, for reacting the removed acidic solution with the metal silicate to generate a metal salt solution, wherein the metal is derived from the metal silicate;

(d) reacting the metal salt solution from the step (c) with the dissolved metal hydroxide solution of the step (a) to produce a reaction solution and generate another metal hydroxide, wherein the metal in said another metal hydroxide is derived from the metal silicate;

(e) separating said another metal hydroxide from the remaining reaction solution in the step (d); and (f) exposing said another metal hydroxide to carbon dioxide from air causing a reaction with the carbon dioxide to form metal bicarbonate, metal carbonate or both, thereby removing and sequestering the carbon dioxide from the atmosphere.

In the method described above, the metal hydroxide is NaOH or KOH, and the another metal hydroxide is $Mg(OH)_2$ or $Ca(OH)_2$. In the method described above, the gas used in the production and use of a chemical compound is hydrogen, oxygen or chlorine gas. In the method described above, the chemical compound is a hydrocarbon, organic compound, acid, ammonia, peroxide, or water.

There is yet another object of the present invention to provide an electrochemical system, apparatus and method to generate metal hydroxide in the presence of metal silicates.

According to yet another aspect of the invention, there is provide an apparatus for electrochemically generating metal hydroxide, oxygen and hydrogen, the apparatus comprising:

an electrolytic container having an anode, a cathode, a direct current source connected to the anode and the cathode, an electrolytic solution comprising a metal salt, the electrolytic solution disposed in said electrolytic container to undergo electrolysis when a direct current is applied, at least one ion-exchange membrane disposed in said electrolytic container between said anode and said cathode and defining a cathode region and an anode region;

a second container disposed externally to said electrolytic container for holding a quantity of a solid metal silicate material, the second container being in fluid communication with said electrolytic container;

means for supplying acidic solution from the anode region to said second container to effect dissolution of said solid metal silicate material and to generate a metal salt solution, wherein the solid metal silicate material, the acidic solution, and the electrolytic solution have been chosen so that:

(i) the metal in the solid silicate material and the metal in said metal salt are the same; and (ii) the metal salt solution and the electrolytic solution contain said metal salt;

means for supplying the metal salt solution from said second container to said electrolytic container.

The apparatus further comprises purification means for purifying said metal salt solution, before passing the purified metal salt solution from said second container to said electrolytic container. In the apparatus described above, the purification unit is configured to remove silica and other compounds from said metal salt solution, the purification unit being disposed between said second container and said electrolytic container.

The apparatus comprises a cation exchange membrane and an anion exchange membrane disposed in said electrolytic container between said anode and said cathode and defining an anode region, a cathode region and a central region therebetween. The apparatus further comprises means for removing gaseous and liquid products from the electrolytic container. Also the apparatus further comprises means for removing and storing the metal hydroxide.

In one embodiment of the apparatus described above, the solid metal silicate is magnesium silicate. The apparatus further comprises means for removing an acid gas from air or a gas volume using said metal hydroxide, for example for removing carbon dioxide.

According to another aspect of the invention, there is provided a method of generating hydrogen, an oxidative gas and a metal hydroxide for sequestering gaseous carbon dioxide or other acid gases, the method comprising:
- (a) supplying a direct current from an electrical source at a predetermined voltage to an electrolytic container having an anode, a cathode, an electrolyte solution comprising a metal salt, an anode region adapted to generate the oxidative gas and an acidic solution, and a cathode region adapted to generate hydrogen gas and a dissolved metal hydroxide solution, the metal in said dissolved metal hydroxide solution being derived from the electrolyte solution;
- (b) supplying, from a source disposed externally to the electrolytic container, a metal silicate soluble in the acidic solution;
- (c) removing the acidic solution from the anode region to another container outside the electrolytic container, for reacting the removed acidic solution with the metal silicate to generate a metal salt solution, wherein the metal is derived from the metal silicate;
- (d) reacting the metal salt solution from the step (c) with the dissolved metal hydroxide solution of the step (a) to produce a reaction solution and generate another metal hydroxide, wherein the metal in said another metal hydroxide is derived from the metal silicate;
- (e) separating said another metal hydroxide from the remaining reaction solution in the step (d); and
- (f) supplying the remaining reaction solution back to the electrolytic container for use as the electrolyte solution.

The method further comprises purifying the metal salt solution after the step (c).

In the method described above:
the step (a) comprises providing the electrolyte solution comprising a soluble monovalent metal salt; and
the step (c) comprises generating the metal salt solution predominantly comprising one or more metals having valency of two or higher.

In the method described above:
the soluble monovalent metal salt contains ions of Na or K; and
the metal derived from the metal silicate is one or more selected from the group consisting of Mg, Ca, Fe, and Cr.

In the method described above, the metal silicate comprises magnesium silicate. In the method described above, the steps (d) and (e) are conducted in a reactor vessel externally to the electrolytic container. In the method described above, the metal hydroxide in the step (e) is solid metal hydroxide, for example solid magnesium hydroxide.

The method further comprises using said metal hydroxide for removing an acid gas from air or a gas volume. In one embodiment of the method described above, the acid gas is carbon dioxide. The method further comprises using a cation exchange membrane and an anion exchange membrane, for defining the anode region, the cathode region and a central region of the electrolytic container.

According to yet another aspect of the invention, there is provided an apparatus for electrochemically generating metal hydroxide, oxygen and hydrogen, the apparatus comprising:
an electrolytic container having an anode, a cathode, a direct current source connected to the anode and the cathode, an electrolyte solution disposed in the electrolytic container to undergo electrolysis when the direct current is applied, two ion-exchange membranes disposed in the electrolytic container between the anode and the cathode and defining a cathode region, an anode region and a central region between the anode region and said cathode region;
a second container disposed externally to said electrolytic container for holding a quantity of a solid metal silicate material, the second container being in fluid communication with said electrolytic container;
means for supplying acidic solution from the anode region to said second container to effect dissolution of said solid mineral silicate material and to generate a metal salt solution wherein the metal is derived from said solid metal silicate material;
purification means configured to purify said metal salt solution;
a hydroxide reactor in fluid communication with the electrolytic container, for precipitating low-solubility metal hydroxides whose metal is derived from the dissolution of the solid metal silicate material; and
a filtering unit connected to the hydroxide reactor and configured for separating the low-solubility precipitate from a solution removed from the hydroxide reactor.

Thus, an improved method and system for reducing carbon dioxide emissions into the atmosphere in the production of chemical compounds have been provided. Also an improved electrochemical system, apparatus and method for generating metal hydroxide in the presence of metal silicates have been provided.

BRIEF DESCRIPTION OF THE DRAWINGS

The accompanying drawings, which constitute a part of the specification, illustrate specific embodiments of the invention and, together with the detailed description of the specific embodiments, serve to explain the principles of the invention.

DETAILED DESCRIPTION OF THE EMBODIMENTS

Terminology

Figure 1:
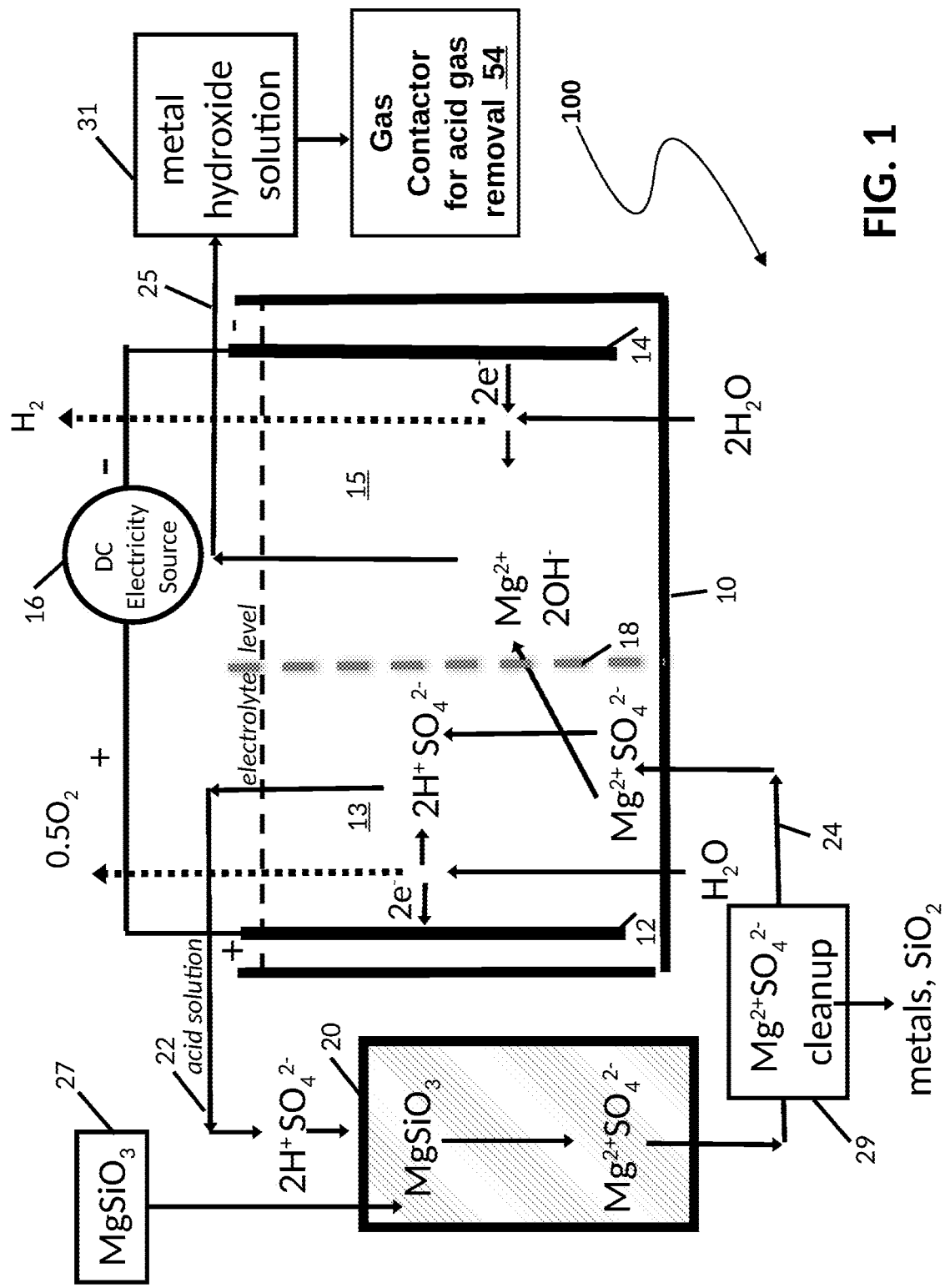
FIG. 1 is a schematic illustration of an embodiment of the apparatus of the present invention with a 2-chambered electrochemical container, or electrolyzer.

For convenience, a list of most frequently used terms in the application are listed below.
- 10: Electrolytic container, or first container
- 12: Anode
- 13: Anode region
- 14: Cathode
- 15: Cathode region
- 16: Source of direct current
- 17: Central region of the electrolytic container 10 between CEM 18 and AEM 26
- 18: Cation exchange membrane (CEM)
- 20: Second container for holding silicate material
- 22: Conduit for supplying acidic solution from the anode region 13 to the second container 20
- 24: Conduit for passing aqueous solution from the second container 20 back to the electrolytic container 10
- 25: Conduit connection to cathode region 15 to remove hydroxides
- 26: Anion exchange membrane (AEM)
- 27: Source of metal silicate, also a metal silicate mass in FIG. 7
- 29: Purification unit for removing silica from solution exiting the second container 20
- 31: Unit containing metal hydroxide solution
- 34: Hydroxide reactor
- 36: Settling/Filtration unit
- 38: Electrolyte Cleanup unit for removing solids, mostly magnesium hydroxide, from solution exiting from reactor 34 before return to the electrolyzer
- 42: Soluble metal salt supply
- 44: Water supply
- 48: Oxygen product
- 49: Acid solution
- 50: Hydrogen product
- 52: Metal hydroxide solution
- 54: Gas/Liquid Contactor for Metal hydroxide use, for example for acid gas removal
- 56: Metal silicate mass reaction with acid solution
- 58: Metal salt solution with silica
- 60: Metal salt solution cleanup
- 62: Silica and other components removed
- 64: Clean metal salt solution recycling
- 72: Monovalent metal salt supply
- 82: Monovalent metal hydroxide solution
- 86: Divalent metal silicate mass
- 88: Divalent metal salt solution and silica
- 90: Divalent metal salt solution cleanup
- 92: Metal hydroxide precipitation
- 94: Solid metal hydroxide
- 98: Monovalent metal salt solution cleanup In the embodiment 100 illustrated in FIG. 1, an electrolytic container 10, also to be referred to as first container 10, has an anode 12 and a cathode 14, both electrodes connected to a source 16 of direct current. The electrolytic container 10 has a cation exchange membrane (CEM) 18 disposed between the anode 12 and the cathode 14, the CEM membrane 18 dividing the electrolytic container 10 into an anode region 13, and a cathode region 15, also to be referred to as an anode chamber 13 and cathode chamber 15 respectively. The electrolytic container 10 is filled at least partially with a conductive electrolytic solution, or electrolyte solution, containing an electrolyte, for example a metal salt dissolved in a polar solvent such as water, such that when the direct current (DC) is applied to the anode 12 and the cathode 14, oxygen or another oxidative gas is generated at the anode 12, and hydrogen is generated at the cathode 14, both gases being removed from the electrolytic container 10 in a well-known manner.

A second container 20 for holding a solid metal silicate material, for example magnesium silicate material, is disposed in the proximity of and outside the electrolytic container 10, the second container 20 being in fluid communication with the electrolytic container 10 by way of a conduit 22 for supplying acidic solution from the anode region 13 to the second container 20, to effect a reaction of the acidic solution with the metal silicate material, and a conduit 24 for passing aqueous solution from the second container 20 back to the electrolytic container 10. A conduit 25 is connected to the cathode region 15 to remove metal hydroxide produced during hydrolysis from the electrolytic container 10. A source 27 of solid metal silicate is provided for replenishing the silicate content in the second container 20.

A purification unit 29 is installed on the conduit 24 for removing at least some undesirable impurities, such as silica, and certain metals, from the solution leaving the second container 20 before the purified solution is returned to the electrolytic container 10.

Unit 31 is provided to retain effluent from the cathode region 15, the effluent containing metal hydroxide, in this embodiment magnesium hydroxide, before further processing of the metal hydroxide, for example in a gas contactor 54 for acid gas removal, for example carbon dioxide removal.

Pumps, valves and control equipment are used in a known manner and not illustrated herein.

As shown in FIG. 1, the electrolysis of a metal salt, in this case magnesium sulfate ($MgSO_4$), dissolved in water generates hydrogen gas ($H_2$) and hydroxide ions ($OH^-$) at the cathode 14 and oxygen ($O_2$) gas and hydrogen ions ($H^+$) at the anode 12. The $OH^-$ ions are then charge-balanced by $Mg^{2+}$ (from the metal salt) forming a metal hydroxide, and the $H^+$ ions are balanced by the $SO_4^{2-}$ ions (from the metal salt) forming an acid, in this case sulfuric acid, $H_2SO_4$. Some of the catholyte solution now containing the metal hydroxide, in this case $Mg(OH)_2$, is withdrawn from the cell 10 into unit 31 for use or further processing.

The acid formed (e.g., $H_2SO_4$) is reacted with a mass of alkaline metal silicate, in this case $MgSiO_3$ mineral as contained in certain rocks. This reaction occurs in a separate vessel 20. Acid solution is withdrawn from the anode chamber 13 of the electrolysis cell 10 and introduced into the vessel 20. The rate and degree of the reaction of the acid and the metal silicate can be desirably increased by using elevated temperature, agitation, mixing, stirring and/or solution recycling within the reactor vessel, treatments that would be difficult or impossible to do if the reaction were performed within the electrolysis cell. Other embodiments may simply use a pile, heap or bed of metal silicate where acid is added to the top of the metal silicate mass and by gravity allowed to travel through and react with the metal silicate mass. If the solution recovered from the reaction vessel or metal silicate mass contains a significant amount of unreacted acid solution, the solution may be returned to the vessel or mass for further contacting and reaction with the metal silicate to increase the amount of metal salts or other products produced.

The reaction between the metal silicate and the acid solution produces water and a metal salt, in the example shown, MgSO$_4$ (FIG. 1). The dissolved portion of the metal salt and the water are then returned to the anolyte (region 13) to resupply electrolyte and water. By analogy, metals other than Mg may participate in the preceding metal silicate/acid reaction as dictated by the metal composition of the metal silicate used, the metal's reactivity with the acid and the metal's solubility in water. As well, anions other than SO$_4^{2-}$ may balance the preceding metals forming the metal salt, as dictated by the anions originally introduced as part of the electrolyte in the electrolysis cell. Metal salts originally introduced as electrolyte include but are not limited to sodium (Na$^+$), potassium (K$^+$), magnesium (Mg$^{2+}$) and calcium (Ca$^{2+}$) sulfate (SO$_4^{2-}$), nitrate (NO$_3^-$), phosphate (PO$_4^{3-}$) and chloride (Cl$^-$).

Whatever metal salt electrolyte is initially used, an important feature of this embodiment is that the anion portion of the electrolyte is mostly if not entirely conserved and recycled, while the metal cation portion of the salt electrolyte is renewed from the metal silicate.

Thus, the metal cations initially composing the electrolyte of the electrolytic container 10 are eventually replaced by metal cations derived from the metal silicate, and the metal composition of the electrolyte can therefore change over time if the initial metal cations differ from those derived from the metal silicate.

The purity of the metal salt solution formed from the reaction of the metal silicate with the acid is a concern when the resulting metal salt solution is used as an electrolyte. It is therefore desirable to avoid the presence of ions and compounds that degrade the performance of the electrolytic container 10. It may also be desirable to remove other constituents formed in the mineral/acid reaction that may have commercial value. These constituents can include but are not limited to aluminum, chromium, nickel, cobalt, iron and/or silica.

Figure 2:
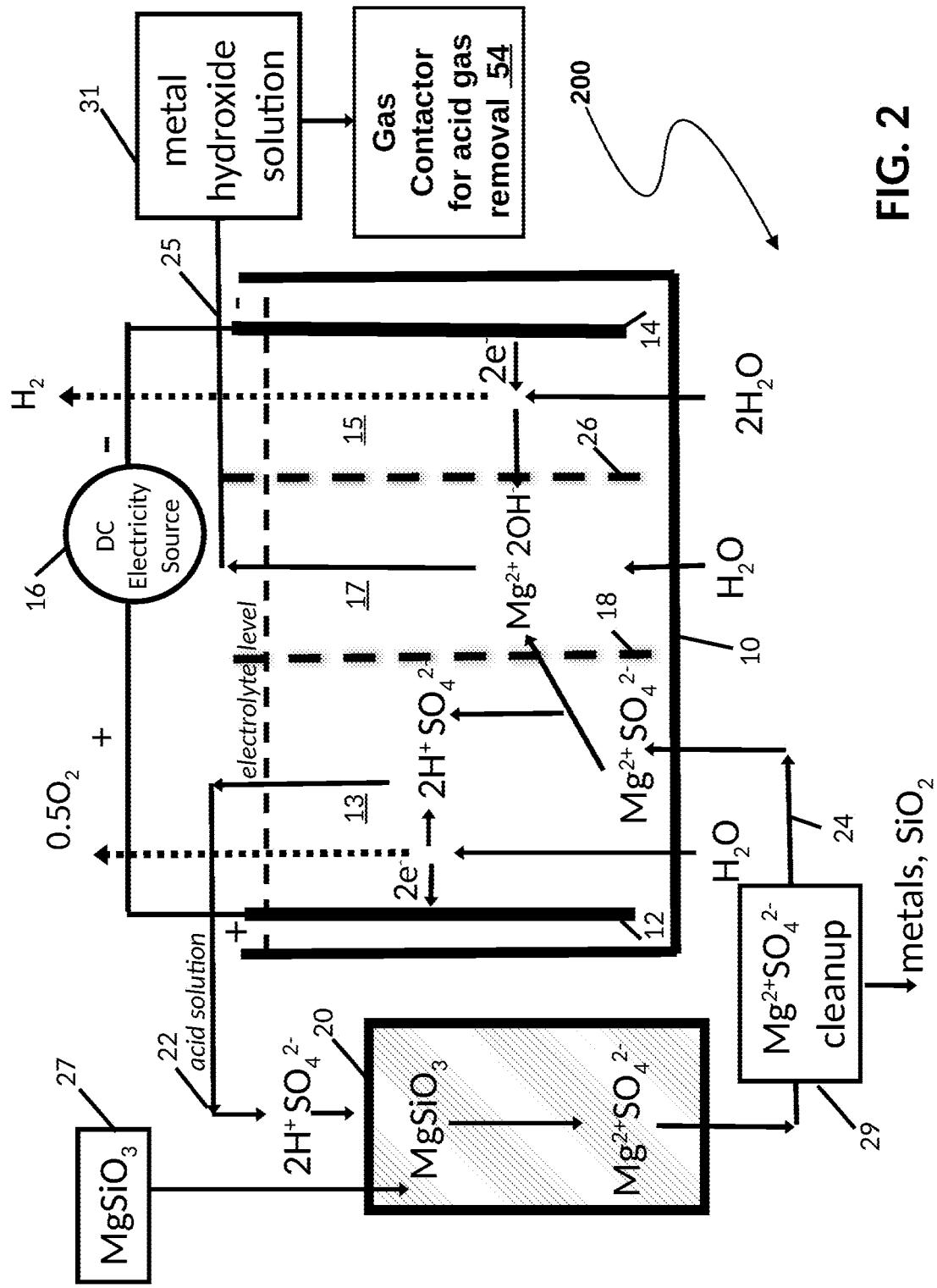
FIG. 2 is a schematic illustration of another embodiment of the apparatus with a 3-chambered electrochemical container.

Various methods can be employed for removing such constituents from the metal salt solution prior to its use as the electrolyte in the electrolytic cell 10 (FIGS. 1 and 2). Such methods include filtration, settling, pH adjustment and precipitation, ion exchange or other purification methods. The removal, also referred to as cleanup procedure, takes place in unit 29. Thus, it is a feature of the invention to provide removal of co-products from the metal salt electrolyte generated in the metal silicate/acid reaction prior to the introduction of the effluent from the second container 20 into the electrolyzer 10.

A cation exchange membrane 18 within the electrolytic container 10 (FIG. 1) is used to help:
i) separate the acid and the base, thus preventing their reaction and neutralization with each other, and
ii) retain the salt anion (in this case SO$_4^{2-}$) in the anolyte and prevent its loss with the removal of the metal hydroxide formed in the cathode region 15.

The balancing metal cations in the metal salt and, hence, the metal hydroxide formed can be at least one of Na, K, Ca, Mg, Al, Fe or other metals, when the metal composing the source metal silicate used: i) contains the corresponding metal, and ii) forms a soluble, dissolved salt during the metal silicate/acid reaction in the second container 20.

It is preferable that the metal silicate be crushed or ground to provide sufficient reactive surface area for contacting and reacting with the acid, and means may be needed to resupply crushed or ground metal silicate that is consumed by the process.

The anions balancing the metal cations in the metal salt can be SO$_4^{2-}$, PO$_4^{3-}$, NO$_3^-$, or other anions:
i) whose pairing with the metal cations forms a metal salt that is soluble in water, and
ii) whose pairing with H$^+$ forms an acid that can react with the metal silicate to form a metal salt and water.

The use of a metal salt solution containing chloride ion, Cl$^-$, can be used as the electrolyte if an acid of sufficient strength to dissolve metal silicate can be generated by the electrolysis of the metal chloride solution.

This can occur via the reaction of the Cl$_2$ (now preferably discharged instead of O$_2$ at the anode) and water to produce a mixture of hypochlorous acid, HOCl, and hydrochloric acid, HCl: Cl$_2$+H$_2$O→HOCl+HCl.

HCl can also be generated by the reaction with the H$_2$ gas produced at the cathode, and Cl$_2$ gas produced at the anode: H$_2$+Cl$_2$→2HCl.

It is also possible to use certain current densities, for example described in a paper to Bennett, J. E. Electrodes for generation of hydrogen and oxygen from seawater. Int. J. Hydrogen 1980, 5, 401-408, in the electrolytic container 10 or to use anodes 13 of certain composition, for example as describe in the paper to Bennett, 1980 cited above, to selectively discharge of O$_2$ rather than Cl$_2$ at the anode 13, thus allowing the H$^+$ produced at the anode 13 to pair with the Cl$^-$ in the electrolyte to form HCl. Water of sufficient purity, such as de-ionized water, must be replenished in the electrolytic container 10 to make up for the water lost to the production of H$_2$ and O$_2$ and the water lost in the removal of the metal hydroxide solution from the electrolytic container 10.

FIG. 2 illustrates a second embodiment 200 using both a cation exchange membrane 18 and an anion exchange membrane 26 to create a 3-chambered electrolytic container 10, now having an anode region (anolyte chamber) 13, a cathode region 15 and a central region 17. Here the anolyte chamber 13 of the cell is configured and operated as in FIG. 1, but where the metal cations from the metal salt electrolyte and OH$^-$ produced at the cathode 14 combine to form a metal hydroxide in the central region 17. This prevents the formation of metal hydroxide from occurring in close proximity to the cathode 14 where the precipitation of the metal hydroxide may occur and thus degrade the operation of the electrolytic container 10.

Similarly as in FIG. 1, fresh metal salt electrolyte solution derived from the metal silicate/acid reaction in the container 20 is returned to the electrolyzer 10 to compensate for the removal of the acid solution and for the loss of water as O$_2$ and Win the anode region 13. Water is also added to the central region 17 and cathode region 15 to make up for metal hydroxide solution removed from the central region 17 and for the consumption of water in the cathodic formation of H$_2$ and OH$^-$.

In the embodiments of FIG. 1 and FIG. 2, the basic chemical reaction sequence is:

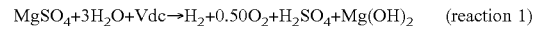
MgSO$_4$+3H$_2$O+Vdc→H$_2$+0.5OO$_2$+H$_2$SO$_4$+Mg(OH)$_2$ (reaction 1)

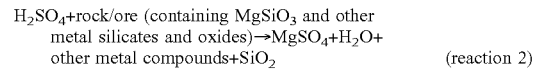
H$_2$SO$_4$+rock/ore (containing MgSiO$_3$ and other metal silicates and oxides)→MgSO$_4$+H$_2$O+ other metal compounds+SiO$_2$ (reaction 2)

where the MgSO$_4$ and H$_2$O produced in reaction 2 are then used in reaction 1. This in effect recycles the SO$_4^{2-}$ and some water portion of the electrolyte (via 22, 24 in FIGS. 1 and 2) while extracting Mg from metal silicates (20, FIGS. 1 and 2) to generate the Mg portion of the electrolyte used in 13 (FIGS. 1 and 2) and the Mg portion of the Mg(OH)$_2$ formed in 15 (FIG. 1) or 17 (FIG. 2).

Figure 3:
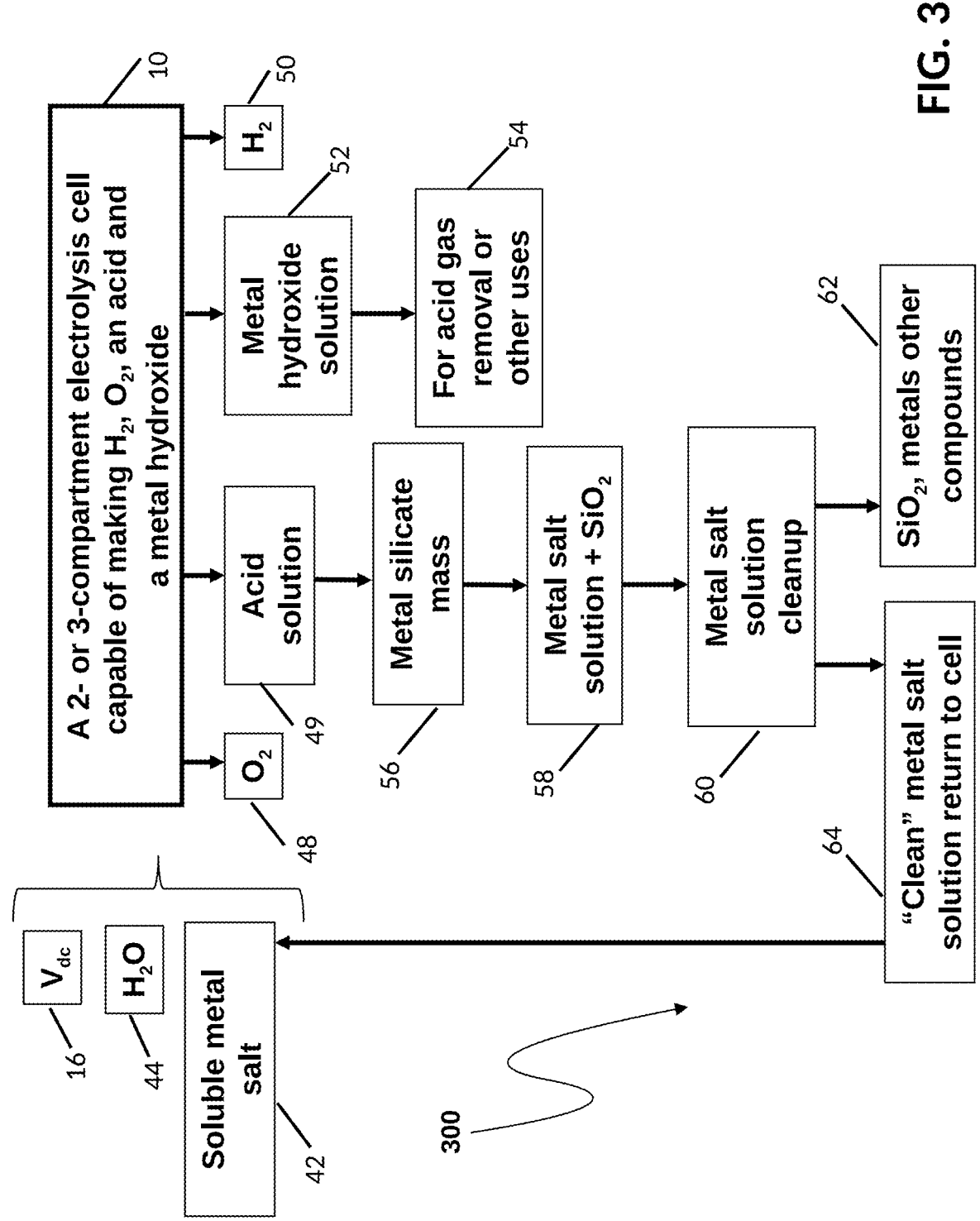
FIG. 3 shows a flow chart diagram illustrating the operation of the apparatus of FIG. 1 and FIG. 2.

A flow chart 300 of the general operation of the preceding embodiments illustrated in FIG. 1 and FIG. 2 is shown in FIG. 3.

The electrolytic container 10 is supplied with a soluble metal salt 42 and water 44. A direct voltage 16 is applied to the electrodes of the electrolytic container 10 resulting in the generation of oxygen 48, hydrogen 50, a metal hydroxide solution 52 and an acid solution 49. Hydrogen and oxygen gases are removed. The metal hydroxide solution 52 is removed to a container 31 (FIG. 1 and FIG. 2) and used for various purposes 54, specifically for capture of acid gases such as carbon dioxide or sulfur dioxide.

The acid solution 49 is transferred by conduit 22 to the second container 20 (FIGS. 1 and 2) where it reacts with a metal silicate mass in step 56 to generate a metal salt solution and silica SiO$_2$ 58, followed by a metal salt cleanup procedure 60 performed in the unit 29 in FIGS. 1 and 2. Silica and optionally other compounds or metals 62 are removed in the unit 29 while the remaining solution 64 is returned to the electrolytic container 10 of FIG. 1 and FIG. 2.

Figure 4:
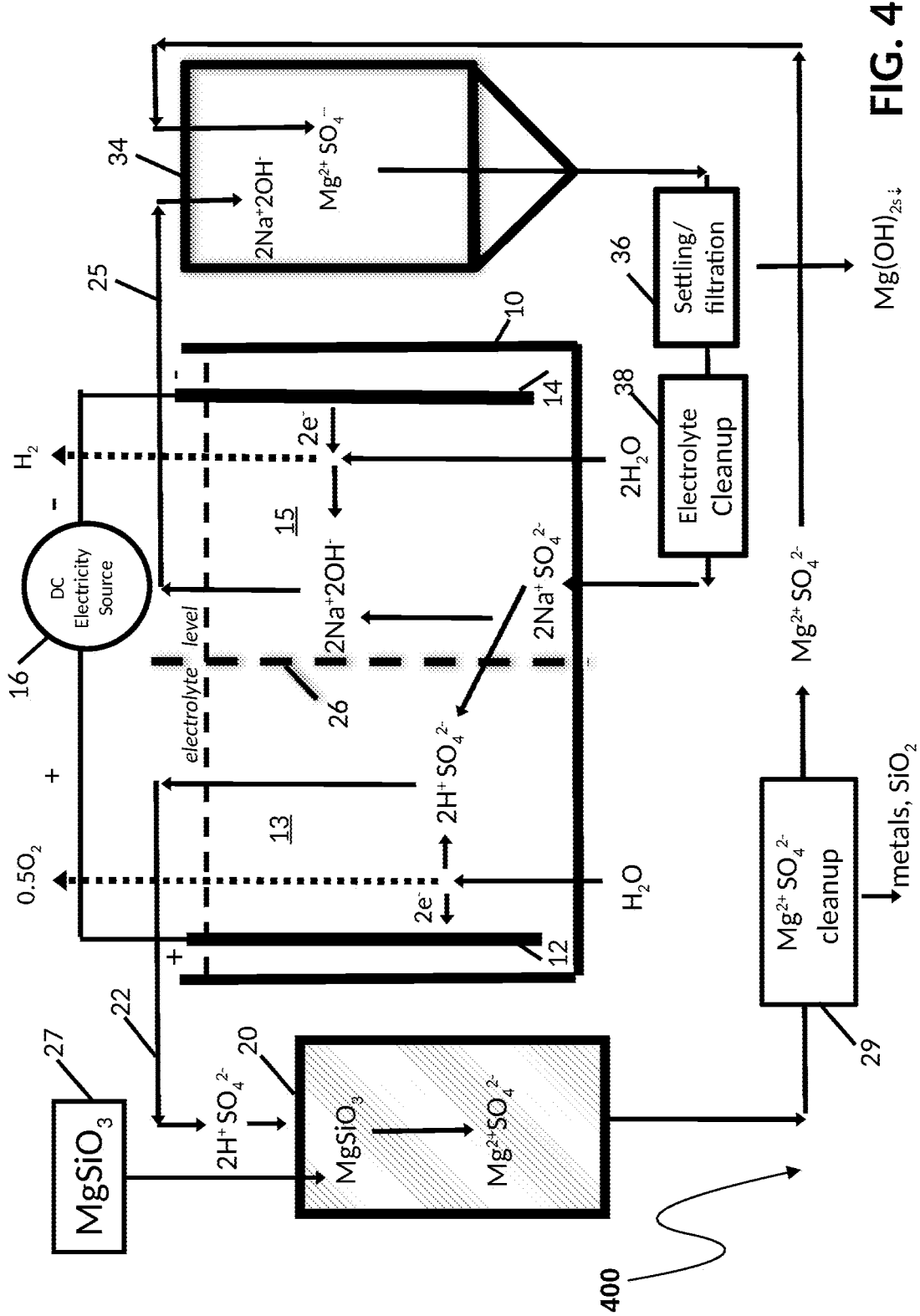
FIG. 4 is a schematic illustration of another embodiment of the apparatus of the present invention with a 2-chambered electrolyzer and a reactor for generating a solid metal hydroxide.

An apparatus 400 of a third embodiment of the invention shown in FIG. 4 uses the anion exchange membrane 26 to separate the anode region 13 and cathode region 15, and thus keeps separate the acid and hydroxide produced in the anode and cathode regions, respectively. Here, the metal used in the electrolyte is preferably a monovalent metal such that the metal hydroxide formed in the cathode region 15 has high solubility, and thus the undesirable fouling of the cell by the precipitation of solid metal hydroxide is reduced or avoided.

In particular, a dissolved metal salt of a monovalent metal ion is used as the electrolyte, for example Na$^+$ or K$^+$ as balanced by anions such as SO$_4^{2-}$, PO$_4^{3-}$, NO$_3^-$ or other anions. In these cases, the metal salt as well as water are split to form H$_2$ and a highly soluble metal hydroxide at the cathode such as NaOH or KOH, while the anion portion of the electrolyte passes through the anion exchange membrane 26 to pair with the H$^+$ formed at the anode 12 to produce an acid, where O$_2$ (or Cl$_2$) is also discharged. In the example shown in FIG. 4, Na$_2$SO$_4$ is used as an electrolyte.

The acid solution formed in the anode region 13 is withdrawn and reacted with a metal silicate mass 27 in the second container 20 to produce a metal salt solution as previously described. Here, due to their abundance in metal silicates, divalent and higher valency metal ions, such as Mg$^{2+}$, Ca$^{2+}$ and Fe$^{2+}$, are likely to be present in the metal salt produced in the second container 20, for example Mg$^{2+}$ as shown in FIGS. 1-4.

Figure 5:
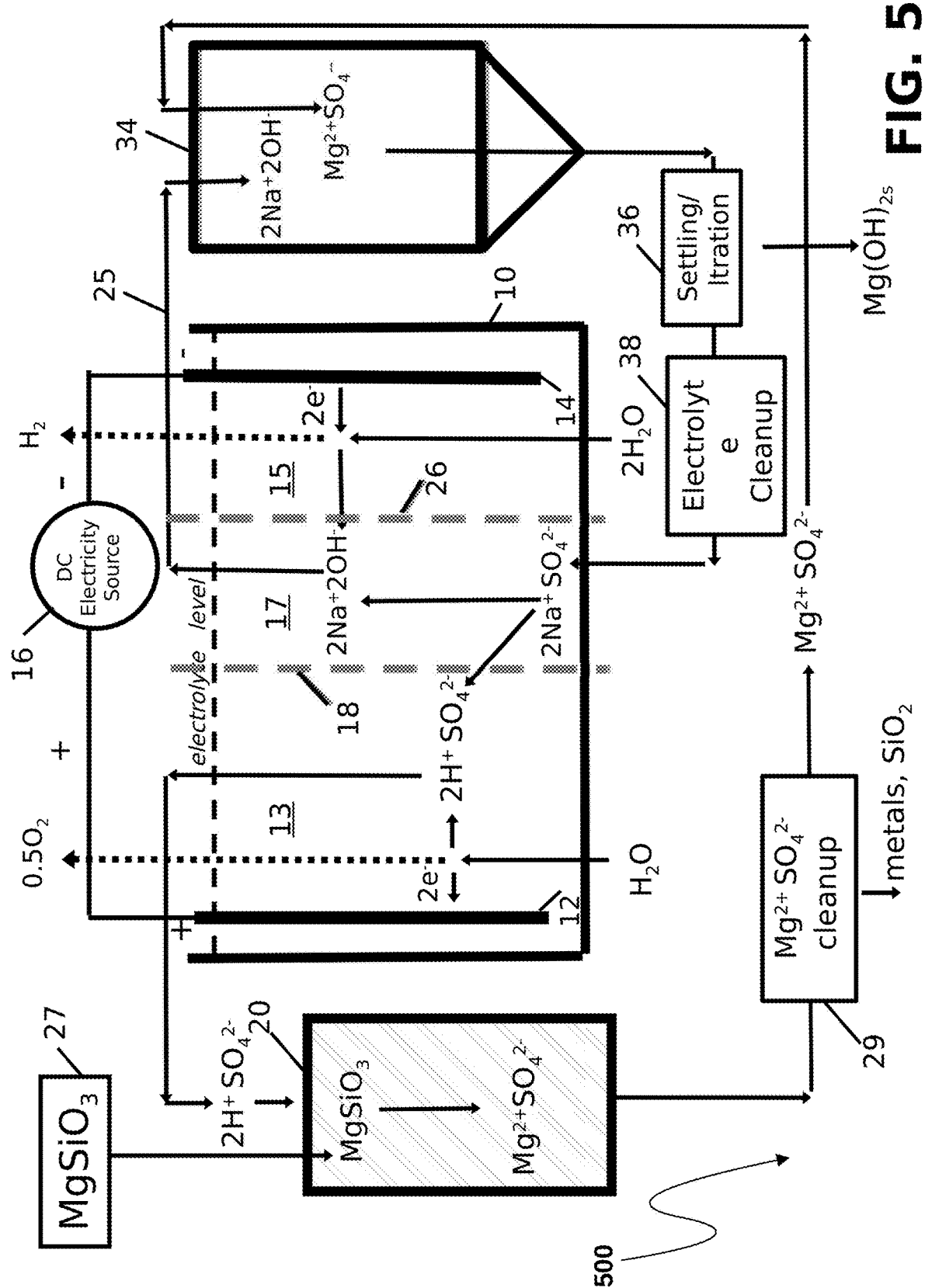
FIG. 5 is a schematic illustration of yet another embodiment with a 3-chambered electrolyzer and a reactor for generating a solid metal hydroxide.

Unlike embodiments 100 and 200 (FIGS. 1 and 2), the metal salt solution produced in the second container 20 (FIG. 4) is not returned to the electrolyzer 10 directly following the silica removal in unit 29, and is instead transferred to a reactor 34 (FIG. 4) to which is also added the metal hydroxide solution produced in the cathode region 15 of container 10 (FIG. 4 and FIG. 5). In the reactor 34, due to the differences in solubility between the monovalent metal ions provided by the metal hydroxide and the divalent or higher valency metal ions provided by the metal salt, divalent of higher valency metal hydroxide precipitates from the solution, thus leaving the reformed monovalent metal salt dissolved in solution.

The precipitate, solid metal hydroxide formed in the reactor 34 can be further separated from the dissolved metal salt solution via flocculation followed by settling-thickening filtration, centrifugation or other solid/liquid separation methods which take place in units 36 (Settling/Filtration) and 38 (Electrolyte Cleanup) as shown in FIG. 4 and FIG. 5.

The monovalent metal salt solution, effluent from units 36 and 38, e.g., Na$_2$SO$_4$ solution, is then returned to the cathode region 15 of the electrolytic container 10 to provide fresh electrolyte.

A further embodiment 500 is illustrated in FIG. 5 wherein both a cation exchange membrane 18 and an anion exchange membrane 26 are used to form a 3-compartment electrolytic container 10. Here, a metal salt electrolyte solution, e.g., Na$_2$SO$_{4aq}$, fills the central region 17, and water fills the anode region 13 and the cathode region 15. With sufficient V$_{dc}$ applied on the anode 12 and cathode 14, a metal hydroxide solution (e.g., NaOH) is now formed in the central region 17, acid (e.g., H$_2$SO$_{4aq}$) and O$_2$ are formed in the anode region 13, and H$_2$ and OH$^-$ are formed in the cathode region 15. The respective solutions in each region 13, 15 and 17 are replenished to compensate for loss of water and electrolyte in water electrolysis, and in metal hydroxide formation and removal. Other aspects of this embodiment have been described above with regard to FIG. 4.

Thus, due to the provision of the reactor 34, the embodiments of FIG. 4 and FIG. 5 avoid the undesirable formation of easily-precipitated metal hydroxides from forming within the electrolytic container 10 while also largely regenerating and conserving electrolyte and water. This is achieved by the intentional formation and removal of solid metal hydroxide in the reactor 34, externally to the electrolytic container 10, and recycling the solution from reactor 34 to the electrolytic container 10, as illustrated in FIGS. 4 and 5.

In the embodiments of FIG. 4 and FIG. 5, the basic chemical reaction sequence is:

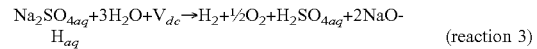

Na$_2$SO$_{4aq}$+3H$_2$O+V$_{dc}$→H$_2$+½O$_2$+H$_2$SO$_{4aq}$+2NaOH$_{aq}$  (reaction 3)

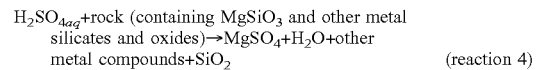

H$_2$SO$_{4aq}$+rock (containing MgSiO$_3$ and other metal silicates and oxides)→MgSO$_4$+H$_2$O+other metal compounds+SiO$_2$  (reaction 4)

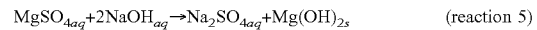

MgSO$_{4aq}$+2NaOH$_{aq}$→Na$_2$SO$_{4aq}$+Mg(OH)$_{2s}$  (reaction 5)

where Na$_2$SO$_{4aq}$ produced in reaction 5 and the H$_2$O produced in reaction 4 are returned to reaction 3, and Mg(OH)$_2$ is removed from solution as a solid. This in effect allows recycling of the Na$_2$SO$_{4aq}$ and some water portion of the electrolyte, while forming and removing Mg(OH)$_2$ as a solid, as well as generating H$_2$, O$_2$, other metal compounds and silica.

In all of the preceding embodiments of FIG. 1-5, the metal hydroxide produced can be contacted with air, waste gas stream or other gas volume to remove some or all of any acid gas originally contained in the gas volume. Such removal occurs when the gas volume containing CO$_2$ and/or any other acid gas is contacted by the above-mentioned metal hydroxide solution, then forming a metal salt of the acid gas. For example:

Mg$^{2+}$+2OH$^-$+2CO$_{2g}$→Mg$^{2+}$+2HCO$_3^-$  (reaction 6)

where Mg$^{2+}$+2OH$^-$ represents Mg(OH)$_2$ dissolved in water, i.e., Mg(OH)$_{2aq}$. Mg$^{2+}$+CO$_3^{2-}$ (MgCO$_{3aq}$) may also form via equilibrium reactions. Furthermore, MgCO$_{3s}$ may be formed as a solid, and may precipitate from solution. The formation of Mg(HCO$_3$)$_{2aq}$, MgCO$_{3aq}$ and/or MgCO$_{3s}$ causes the original acid gas, in this case CO$_2$, to be sequestered from the gas volume, thus desirably reducing its acid gas burden. By analogy, other metal hydroxides can be produced by the embodiments of the present invention such as Ca(OH)$_2$ and Fe(OH)$_2$, and may be used in the preceding reactions to reduce the acid gas burden in a gas volume.

When the metal hydroxide is in dissolved form, the contacting of the metal hydroxide solution and the gas volume may occur in a conventional gas/liquid contactor 54 known in the art, thus producing a metal salt of the acid gas, e.g., Mg(HCO$_3$)$_{2aq}$, MgCO$_{3aq}$ and/or MgCO$_{3s}$ via reaction 6.

Similarly, when the metal hydroxide is in solid form, e.g., a Mg(OH)$_{2s}$, an engineered gas/solids contactor can be employed if sufficient water is supplied to dissolve some of the metal hydroxide to facilitate the formation of dissolved or solid metal salt of the acid gas, e.g., Mg(HCO$_3$)$_{2aq}$, MgCO$_{3aq}$ and/or MgCO$_{3s}$ via reaction 6. To facilitate transportation and use, the mass of solid, wet, metal hydroxide particles may also be dewatered by pressure filtration, centrifuging, squeezing, heating, evaporation vacuum or other dewatering method to form a dry, metal hydroxide mass.

Figure 6:
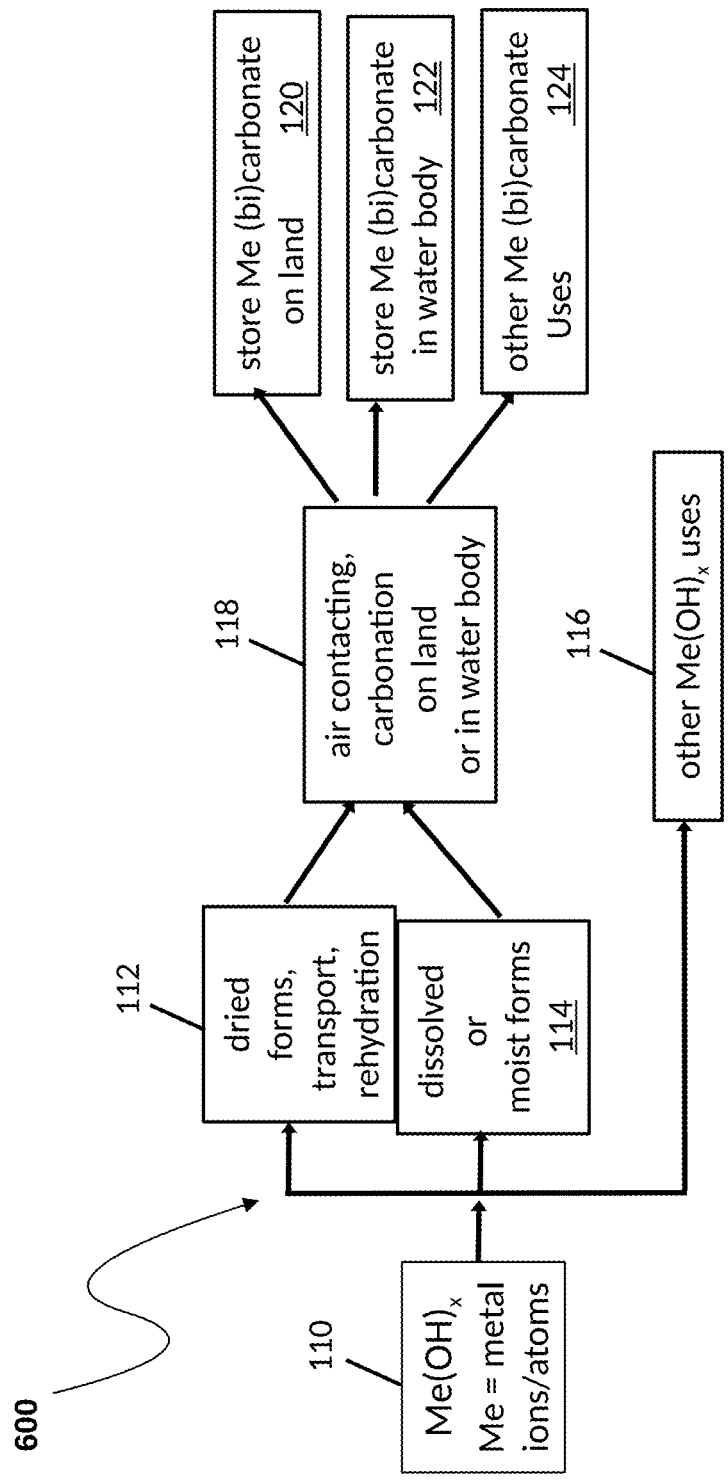
FIG. 6 is an illustration of the exemplary use of the metal hydroxide produced in accordance with embodiments of the present invention.

A flow chart 600 illustrating the possible use of metal hydroxides and (bi)carbonate in performing CO$_2$ removal from air is shown in FIG. 6. Metal hydroxides 110 generated by the method and apparatus of the invention can be produced in dry forms 112 for easier transport and further rehydration; or in dissolved or moist forms 114. The hydroxides may also have other uses 116 unrelated to sequestering of acid gases. The hydroxides, either in dried form 112 or moist/dissolved form 114 can be contacted 118 with contaminants in air, distributed on land or in water bodies. Subsequently, in the case of carbon dioxide capture, metal carbonates or bicarbonates can be stored on land 120, in a water body 122 or used for other purposes 124.

When acid gas removal from air is desired, the metal hydroxide/acid gas contacting can also occur at the interface between a natural or artificial waterbody and the overlying air, wherein the produced metal hydroxide (solid or dissolved) is added to the surface waters of the waterbody, thus chemically increasing the acid gas uptake and retention by the surface waters, and drawing in and sequestering some or all of the acid gas from the overlying atmosphere, e.g., via reaction 6.

Such water bodies include but are not limited to natural ponds, lakes, rivers and oceans as well as artificial reservoirs or wastewater streams. It is desirable to keep the concentration of the added, dissolved metal hydroxide in the water body below that which causes biological or environmental harm, typically a concentration that effects a water body pH of <9, and preferably pH<8.5. Keeping chemical and biological impacts within acceptable/beneficial limits can be facilitated by dilution of the metal hydroxide(s) prior to release into a water body and/or packaging and releasing the metal hydroxide(s) in a way that limits the rate at which dissolve metal hydroxide(s) is/are added to the water body.

A further feature of the invention is that the addition of the metal hydroxide and/or metal (bi)carbonate produced therefrom may be used to beneficially elevate the pH of natural or artificial water bodies whose pH is otherwise below that deemed environmentally optimal.

For example, the metal hydroxide and/or the metal (bi) carbonate produced from it can be added to a wastewater stream whose low pH would otherwise impact the biology and chemistry of the water body receiving the wastewater stream. The produced metal hydroxide and/or produced metal salt can be added to the ocean or other natural water body for the purpose of beneficially raising the pH of the water body. The metal hydroxide and/or the metal (bi) carbonate produced from it may also be added to aquacultural systems to help control pH and to supply beneficial nutrients and elements.

The metal bicarbonate and/or carbonate or other metal salts formed via the metal hydroxide/acid gas reaction may have uses other than for sequestering acid gas or modifying water body pH, and, further, that the metal hydroxide may have uses other than for acid gas removal. These uses include but are not limited to chemical, industrial, environmental, aquacultural and agricultural uses.

The H$_2$ and O$_2$ produced during the electrolysis can be harvested, processed, pressurized, stored and/or used by employing methods known in the art. Alternatively, the H$_2$ and O$_2$ can be reacted internally within the electrochemical cell via the use of a gas diffusion electrode. This reduces the energy cost of the metal hydroxide production, but precludes H$_2$ and O$_2$ as marketable co-products of the system.

Thus, by combining reactions 3-6, the net electrogeochemical reaction in the preceding example is:

rock/ore (containing MgSiO$_{3s}$ and other metal silicates and oxides)+2H$_2$O+2CO$_{2g}$+V$_{dc}$→H$_2$+ 0.5O$_2$+Mg(HCO$_3$)$_{2aq}$+other metal compounds+ SiO$_2$ 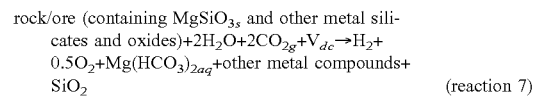 (reaction 7)

or if dissolved or solid MgCO$_3$ is formed:

rock/ore (containing MgSiO$_{3s}$ and other metal silicates and oxides)+H$_2$O+CO$_{2g}$+V$_{dc}$→H$_2$+0.5O$_2$+ MgCO$_3$+other metal compounds+SiO$_2$ 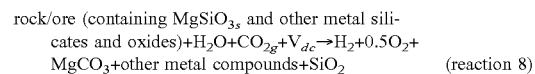 (reaction 8)

Metal hydroxides other than or in addition to Mg(OH)$_2$ may form due to the use of rock/ore containing metals other than or in addition to Mg and therefore that metal bicarbonates and or carbonates other than Mg(HCO$_3$)$_2$ and MgCO$_3$ may form upon metal hydroxide carbonation. Also, acid gases other than CO$_2$ may participate in these reactions thus forming metal salts other than metal bicarbonate and carbonate.

Figure 7:
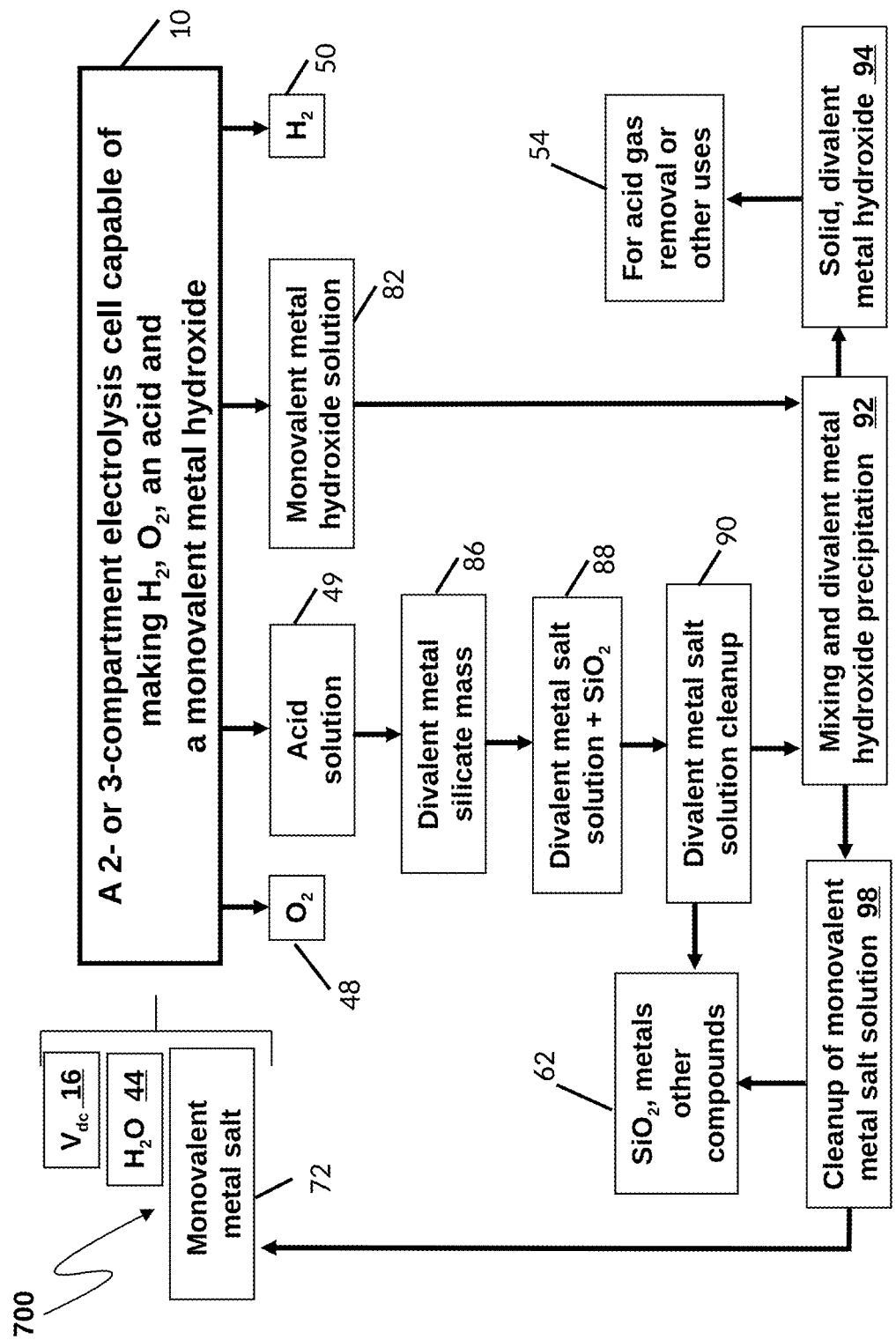
FIG. 7 shows a flow chart diagram illustrating the operation of the apparatus of FIG. 4 and FIG. 5.

A flow-chart 700 of the operation of the apparatus of FIG. 4 and FIG. 5 with 2- and 3-compartment electrolytic container 10 respectively for purposes of generating a solid metal hydroxide from a metal silicate is shown in FIG. 7.

In FIG. 7, the electrolytic container 10 corresponds to the electrolytic container 10 in FIGS. 4 and 5. It is supplied with a monovalent metal salt 72 and water 44. A direct voltage 16 is applied to the electrodes of the electrolytic container 10 resulting in the generation of oxygen 48, hydrogen 50, a monovalent metal hydroxide solution 82 and an acid solution 49. Hydrogen and oxygen gases 48, 50 are removed. The metal hydroxide solution 82 is conveyed to a mixing and divalent metal hydroxide precipitation step 92 performed in the hydroxide reactor 34 of FIG. 4 and FIG. 5.

The acid solution 49 is transferred to the second container 20 (FIGS. 4 and 5) where it reacts with a divalent metal silicate mass 86 to generate a divalent metal salt solution and silica SiO$_2$ mixture 88, followed by a metal salt cleanup procedure 90 performed in the unit 29 in FIGS. 4 and 5. Silica and optionally other compounds or metals 62 are removed in the unit 29 while the remaining solution 64 is transferred to the step 92.

In the step 92, a precipitation of solid divalent metal hydroxide 94 from a monovalent metal salt solution takes place. The precipitated hydroxide is removed at step 54 performed in the unit 36 of FIGS. 4 and 5 for acid gas sequestering or other uses. The remaining monovalent salt solution from the step 92 is processed in the step 98 (cleanup of monovalent metal salt solution), performed in the unit 38 and conveyed to the step 72, thus closing a loop.

Example 1

A two-compartment electrolysis cell 10 is assembled such that an anion exchange membrane 26 divides the cathode region 13 and the anode region 15. A platinized titanium or a nickel cathode 14 is inserted into the cathode region 15, and an iridium oxide coated anode 12 is inserted into the anode region 13. The anode region 13 and the cathode region 15 have inlet and outlet ports to facilitate the addition of water and electrolyte solution, and the removal of electrolysis products and any unreacted electrolyte solution.

The cathode region 15 is plumbed to a reservoir containing a 15-25% solution of $Na_2SO_4$ in de-ionized water, and the anode region 13 is plumbed to a source of de-ionized water.

The anode region 13 and the cathode region 15 are filled with the respective solutions, and a direct current electrical potential of 4-6 $V_{dc}$ is applied that allows for the splitting of the salt and water into hydrogen gas ($H_2$), oxygen gas ($O_2$), sulfuric acid ($H_2SO_4$) and sodium hydroxide (NaOH). The $O_2$- and $H_2SO_4$- containing solution is removed from the anode region 13, and dissolved $O_2$ is allowed to further degas from the solution and is either vented to the atmosphere or further processed for use.

De-ionized water is added to the anode region 13 to compensate for the loss of water in the formation of $O_2$ and the removal of the $H_2SO_4$ solution. The rate of the removal of the $O_2+H_2SO_4$ solution from the anode region 13 and the corresponding rate of de-ionized water addition determines the concentration of the $H_2SO_4$ solution formed, with the desired $H_2SO_4$ concentration being >7 wt. % or having a solution pH of <3.

The $H_2SO_4$ solution is pumped to the top of the second container 20 containing a mass (heap, pile or bed) of crushed rock fragments containing metal silicate minerals of the following approximate composition as an example: 38% MgO, 38% $SiO_2$, 18% Fe, 1% CaO, 1% $Al_3O_3$, 0.2% Ni, 0.01% Cr and other constituents.

The $H_2SO_4$ solution applied to the top of the crushed rock mass flows down by gravity through and reacts with the crushed rock mass, producing sulfate salts of the metals contained in the rock mass. Those metal salts that are soluble and still contained in the solution at the bottom of the rock mass are collected at the bottom of the second container 20. The collected solution will primarily contain $MgSO_{4aq}$ as well as smaller quantities of other metal sulfates, any unreacted $H_2SO_4$, dissolved silica, and possibly suspended particles. The acid leaching of the crushed rock mass is allowed to progress until the rate of metal ion concentration increase levels off.

In this example, the most efficient deployment of the embodiments of the invention limits the actual extraction efficiency within a range from about 25% to 80%, preferably from 30 to 60%. This is achieved by setting the mass ratio of the $H_2SO_4$ solution and rock mass within a range from 2:1 to 6:1 preferably from 3:1 to 5:1. The molar ratio of $H_2SO_4$ supplied versus the $MgSO_4$ formed ranges from 0.35 to 0.95, and preferably from 0.45 to 0.65. The irrigation rate of the acid solution should range from 0.08 to 0.4 liters per minute per square meter of rock mass footprint, and preferably from 0.12 to 0.28 liters/(min.×meter$^2$). The solution collected from the bottom of the rock mass will primarily contain $MgSO_{4aq}$ as well as smaller quantities of other metal sulfates, any unreacted $H_2SO_4$, dissolved silica, and possibly suspended particles.

The solution pH may then be lowered via adding additional $H_2SO_4$ solution to facilitate precipitation of solid or colloidal silica and/or other silicone-containing compounds. These compounds are filtered from the solution or removed by other means and discarded or further processed into marketable products such as silica. The remaining solution, predominantly containing $MgSO_{4aq}$ and smaller quantities of other dissolved metal sulfates, and possibly other compounds, is then pumped into the vessel (reactor) 34 holding a $MgSO_4$ solution.

Meanwhile, a portion of the solution containing $H_2$ and NaOH formed in the cathode region 15 and any unreacted $Na_2SO_4$ solution is removed from the cathode region 15. The removal rate of this solution is such that a 10 wt % or higher wt. % NaOH solution (pH>12) is formed and removed. The $H_2$ gas is separated from the solution and the $H_2$ gas is vented or further processed and stored for eventual use or sale.

The remaining solution, predominantly an NaOH solution is then added to a vessel 34, a reaction reservoir into which the dissolved metal sulfate solution produced in the container 20 is also added. Due to significant differences in solubility of metal ions in the presence of hydroxide ions, the less soluble divalent and higher valency metal hydroxides precipitate from solution. In this case the dominant hydroxide precipitated is $Mg(OH)_{2s}$, followed by lesser quantities of $Fe(OH)_{2s}$, $Ca(OH)_{2s}$, $Ni(OH)_2$ and $Cr(OH)_{3s}$, etc.

The threshold solution pH at which these metal hydroxides precipitate differs among the metal ion species and it is therefore possible to selectively precipitate specific metal hydroxides by sequentially increasing pH. The precipitation sequence as pH rises is: $Cr(OH)_3$, $Ni(OH)_2$, $Fe(OH)_2$ $Mg(OH)_2$, and $Ca(OH)_2$. In any case, the solid metal hydroxides either separately or in bulk are then harvested from solution by filtration or other methods of liquid/solid separation. This can be preceded by adding a flocculant/coagulant such as $Ca(OH)_2$ that speeds the settling of suspended metal hydroxide particles.

The remaining solution in the vessel 34, now predominantly $Na_2SO_{4aq}$, is further processed before being returned to the electrolytic container 10 to function as the electrolyte (e.g., FIGS. 4 and 5). The $Na_2SO_4$ solution processing is to remove any remaining impurities that would interfere with functioning of the electrolytic container 10, in particular the removal of any remaining divalent metal ions and silica. Such processing can include but is not limited to nanofiltration and ion exchange. Any required addition of de-ionized water to make up for $H_2$ and $O_2$ production and other losses is added to the cathode region 15 and the anode region 13 as needed.

The moist, solid metal hydroxides, either the $Mg(OH)_{2s}$ alone or together with the other metal hydroxides harvested as previously described, are spread on the ground (e.g., on top of the mine tailings of the mine from which the metal silicates were mined) so as to facilitate air contacting and the removal and sequestration of $CO_2$ from the air (e.g., via reaction 6 above).

The moist, metal hydroxides may also be added to an artificial pond to elevate $OH^-$ in the pond and hence facilitate $CO_2$ removal and sequestration from air. Likewise, the metal hydroxides may also be added to surface waters of natural water bodies like the ocean provided that the resulting chemical and biological impacts are acceptable/beneficial, in particular that pH and dissolved metal and Si concentrations do not exceed safe limits. Keeping chemical and biological impacts within acceptable/beneficial limits can be facilitated by dilution of the metal hydroxide(s) prior to release into a water body and/or packaging the metal hydroxide(s) in a way that limits the rate at which dissolve metal hydroxide(s) is/are added to the water body.

The transport of the metal hydroxides can be facilitated by dewatering the moist, metal hydroxide solids via pressure filtration, centrifuging, heat drying or other methods. Those metal hydroxides not used to facilitate $CO_2$ removal and sequestration can be used for other purposes including refinement to reduced metals such as Fe, Ni and Cr.

Example 2

The above-described electrolysis, hydroxide production and electrolyte recycling (Example 1) can also be performed in a three-compartment cell as illustrated in FIG. 5, wherein the metal salt electrolyte, e.g. $Na_2SO_{4aq}$, is introduced into the central region 17 rather than the anode region 13, and deionized water is introduced into the anode region 13 and the cathode region 15. Here a voltage greater than that applied in the Example 1 (e.g. >6V) is required to overcome the added resistance caused by the use of two membranes in the Example 2 rather than the use of one membrane in the Example 1. Otherwise the features, operation and products of the Example 2 are similar to that of the Example 1.

It is understood that any metalliferous compound may be used in place of the above-mentioned metal silicate if that metalliferous compound reacts with the above-mentioned acid solution to form a metal salt in solution and that metal salt solution can act as an electrolyte and/or as the source of metal hydroxide as described in the preceding embodiments. Such metalliferous compounds include but are not limited to metal carbonates and bicarbonates.

Reducing CO2 Emissions of Chemical Compound Production and Use

As described above, methods of hydrogen gas and oxygen gas production can be conducted in ways that consume and sequester atmospheric $CO_2$. Thus, the amount of air $CO_2$ consumed and stored by the methods of the present invention may be deducted from the sum of the $CO_2$ emissions associated with that $H_2$ and $O_2$ gas production in calculating the net $CO_2$ emissions intensity of the gases produced.

The sources of such $CO_2$ emissions include but are not limited to the following:
i) production and delivery of the required electricity;
ii) production, maintenance and operation of the required infrastructure; and
iii) production, processing, and delivery of raw materials.

Because $CO_2$ emissions associated with the generation of electricity will be the dominant $CO_2$ emission source of the invention if fossil-derived electricity is used, total $CO_2$ emissions may be significantly reduced to near zero by the use of non-fossil sources of electricity such as from solar, wind, geothermal and nuclear sources. This feature, when combined with the above-mentioned removal of atmospheric $CO_2$ by the present invention, may then result in total net $CO_2$ emissions of the invention that is a negative number, that is more $CO_2$ is consumed by the process than is emitted.

The gases so produced can then be termed negative-emissions $H_2$ and $O_2$. As will be shown, the use of such gases in the refining, or the synthesis of a chemical compound will then reduce the net $CO_2$ emissions of that compound, in some cases making it also a net negative-emissions product. This can be advantageous in reducing overall $CO_2$ emissions in the production and use of chemical compounds where the reduction in $CO_2$ emissions (e.g., via capture and sequestration $CO_2$ emissions) directly emanating from the production or use would otherwise be difficult, expensive or impossible to do.

Figure 8:
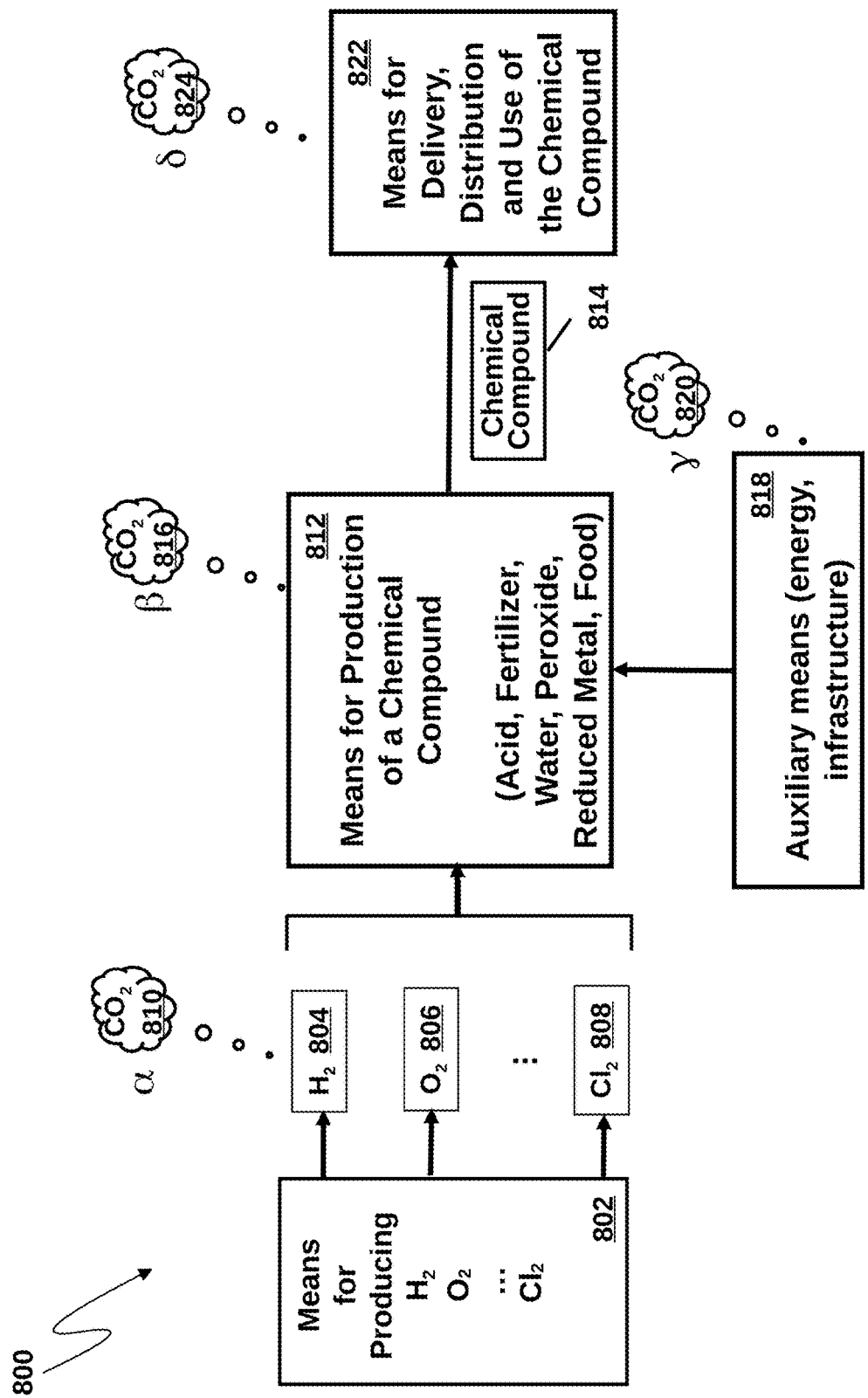
FIG. 8 shows a prior art system for the production of a chemical compound.

FIG. 8 illustrates a prior art system 800 for producing a chemical compound, for example hydrocarbons, organic compounds, acid, fertilizer, water, peroxide, reduced metal, certain food products as will be described in greater detail below. The system 800 comprises means 802 for delivery and producing various reagents required for the production of the chemical compound such as $H_2$ (804), $O_2$ (806), $Cl_2$ (808) and others. A first amount α (810) of $CO_2$ emissions is emitted during the production of the reagents $H_2$ (804), $O_2$ (806) or $Cl_2$ (808) and other input materials/reagents other than $H_2$ (804), $O_2$ (806) or $Cl_2$ (808) as shown, for example, in FIG. 12.

One or more of the required reagents 804, 806 and 808 are supplied to the means for production 812 of the chemical compound for conducting a chemical reaction in a chemical vessel (not shown) of the means for production 812 to produce the chemical compound 814 as an output 814 from the means for production 812. A second amount β (816) of $CO_2$ emissions is emitted by the means for production 812 during the production of the chemical compound 814.

Certain auxiliary means 818 are required for generating energy, supplying required pressure, and providing other elements of the infrastructure for conducting the chemical reaction of the means 812 to produce the chemical compound 814. A third amount γ (820) of $CO_2$ emissions is emitted by the auxiliary means 818. And finally, the produced chemical compound is supplied to the means 822 for delivery, distribution and use of the chemical compound 814, which collectively emit a fourth amount δ (824) of $CO_2$ emissions.

Thus, the total amount of $CO_2$ emissions during the prior art production of the chemical compound of FIG. 8 is $\alpha+\beta+\gamma+\delta$.

For example, FIG. 8 including means 812 may represent a plant for refining of gasoline from crude oil wherein hydrogen (804) is used in the refining and this hydrogen is produced (802) via the gasification of a fossil fuel-methane. Additional fossil energy (818) is used in the refining process. The resulting gasoline is distributed (822) by truck (using fossil energy) to a gas station where it is used for fueling of cars for transportation (822). As will be shown latter, each of these means emit significant amounts of $CO_2$ to the atmosphere and the total emissions per unit of product can be significantly reduced by embodiments of the present invention.

Figure 9:
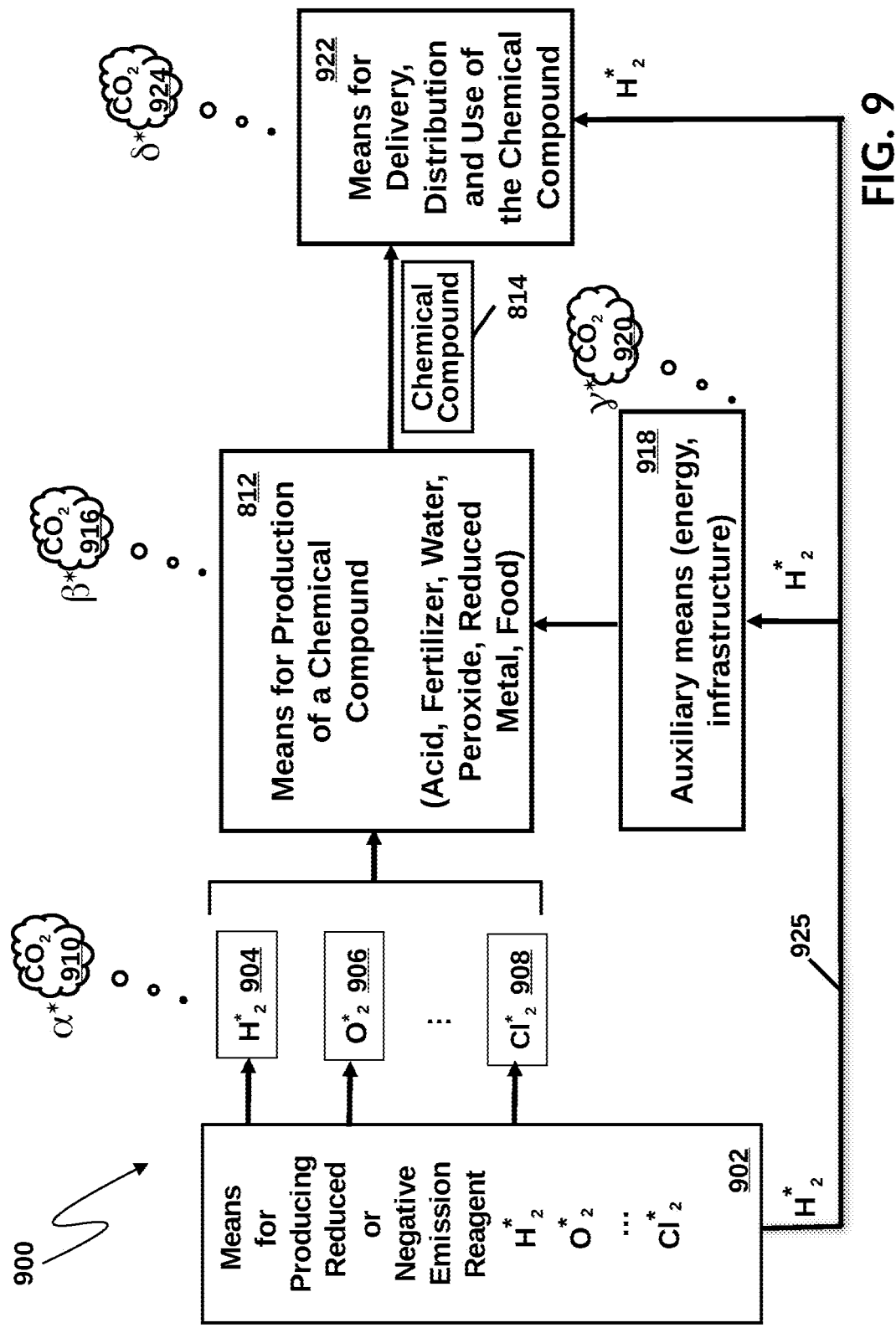
FIG. 9 shows a system of the embodiment of the invention for the production of a chemical compound.

FIG. 9 illustrates a system 900 of the embodiment of the present invention for producing the chemical compound 814. The system 900 of FIG. 9 is similar to the system 800 of FIG. 8, where the same elements are designated with same reference numerals. However, the system 900 differs from the prior art system 800 in that the means for producing the reagents 802 $H_2$ (804), $O_2$ (806), $Cl_2$ (808) are modified into the means for producing reduced or negative emission reagents 902 so that to reduce carbon dioxide emission or even to sequester the carbon dioxide from the outside environment. Accordingly, such reagents will now be referred to as reduced emission reagents and negative emission reagents respectively, and designated as $H^*_2$ (904), $O^*_2$ (906), $Cl^*_2$ (908) with an asterisk as superscript.

To further reduce carbon dioxide emissions, a reduced emission reagent, for example $H^*_2$ (904), may be supplied as fuel, via supply line 925, to the auxiliary means 918, and the means for delivery, distribution and use 922 for energy generation.

Thus, the total amount of $CO_2$ emissions during production of the chemical compound of FIG. 9 will be $\alpha^*+\beta^*+\gamma^*+\delta^*$, wherein $\alpha^*$ is a first modified amount 910 of $CO_2$ emissions emitted during the production of the reagents $H_2$ (904), $O_2$ (906), $Cl_2$ (908) and other input materials or reagents other than the reagents $H_2$ (804), $O_2$ (806) or $Cl_2$ (808) required for the production of the chemical compound. Such other input regents or materials may include but are not limited to crude oil, natural gas, biomass, synthetic hydrocarbons, gases, acids, bases, oxides and salts, some examples are given in detail below. $\beta^*$ is a second modified amount 916 of $CO_2$ emissions is emitted by the means for production 812 during the production of the chemical compound 814; $\gamma^*$ is a third modified amount 920 of $CO_2$ emissions is emitted by the auxiliary means 918; and $\delta^*$ is a fourth modified amount 924 of $CO_2$ emissions emitted during the delivery, distribution and use of the chemical compound 814.

As a result, the total amount of modified emissions in the system of FIG. 9 is smaller than that of FIG. 8, namely $\alpha^*+\beta^*+\gamma^*+\delta^* < \alpha+\beta+\gamma+\delta$. It is understood that only one or more components of the total $CO_2$ emissions may need to be reduced in order to effect a reduction of the total $CO_2$ emissions, for example, $\alpha^*+\beta+\gamma+\delta < \alpha+\beta+\gamma+\delta$.

Figure 10:
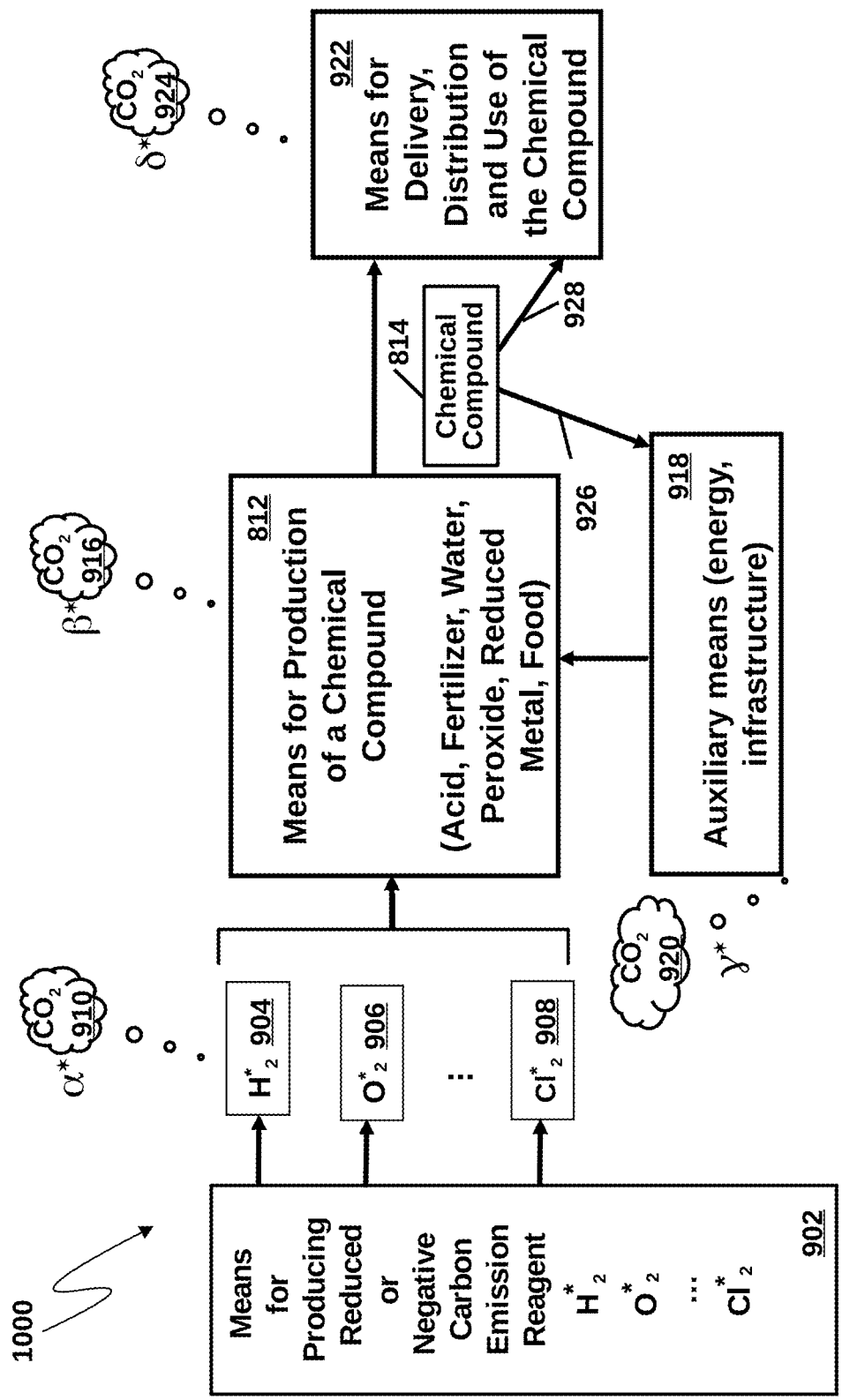
FIG. 10 shows another system of another embodiment of the invention for the production of a chemical compound.

FIG. 10 illustrates a system 1000 of another embodiment of the present invention for production of the chemical compound 814, which is suitable for use as fuel, for example ammonia. The system 1000 of FIG. 10 is similar to the system 900 of FIG. 9, where the same elements are designated with same reference numerals.

However, the system 1000 differs from the system 900 in that, the supply line 925 for supplying the reduced or negative emission reagent, for example 904, to the auxiliary means 918 and the means for delivery 922 has been removed.

Instead, a fraction 926 of the chemical compound 814 is diverted to the auxiliary means 918 for use as fuel to sustain the chemical reaction in the means for production 812 in terms of required energy. Due to the introduction of a feedback loop from the chemical compound 814 at the output of the means for production 812 down to (arrow 926) the auxiliary means 918 and back to the means for production 812, the energy required in production 812 is supplemented.

Another fraction 928 of the chemical compound 814 is supplied to the means for delivery 922 to be used as fuel.

Figure 11:
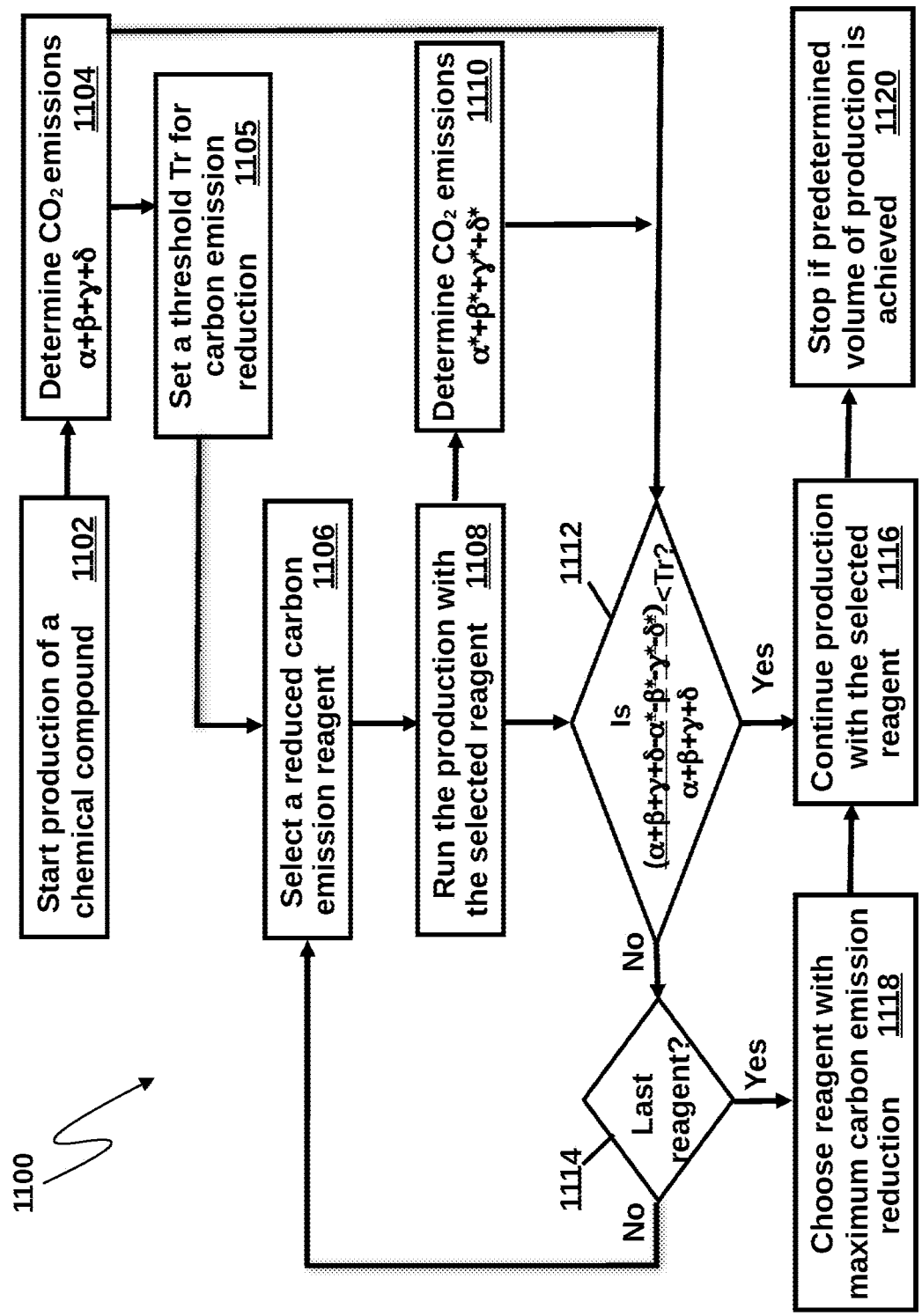
FIG. 11 illustrates the operation of the systems of FIGS. 8, 9 and 10 for the production of the chemical compound.

FIG. 11 shows a flow-chart 1100 illustrating a method of operation of the systems 900 and 1000 of FIGS. 9 and 10. Upon starting the production of the chemical compound 814 by a selected known method (box 1102), the method determines total $CO_2$ emissions $\alpha+\beta+\gamma+\delta$ emitted at various stages of the method (box 1104), followed by setting a required threshold Tr for carbon emission reduction in the production process (box 1105), for example as a percentage of the total total $CO_2$ emissions $\alpha+\beta+\gamma+\delta$. Next, a reduced carbon emission reagent is selected (box 1106), followed by running the production of the chemical compound with the selected reagent (box 1108) and determining the total modified $CO_2$ emissions $\alpha^*+\beta^*+\gamma^*+\delta^*$ (box 1110). In the embodiments of the present invention, it is understood that only one component $\alpha^*$ may be reduced, while other remaining components $\beta+\gamma+\delta$ may remain the same. Similarly, only two or three components may be reduced, for example $\alpha^*+\beta^*$ or $\alpha^*+\beta^*+\gamma^*$, while other corresponding remaining components may remain unchanged.

Provided an increase in the total modified $CO_2$ emissions $\alpha^*+\beta^*+\gamma^*+\delta^*$ compared with the total total $CO_2$ emissions $\alpha+\beta+\gamma+\delta$ does not exceed the required threshold Tr (exit Yes from box 1112), i.e.

$$[(\alpha^*+\beta^*+\gamma^*+\delta^*)-(\alpha+\beta+\gamma+\delta)]/(\alpha+\beta+\gamma+\delta) < Tr \quad \text{(equation 1)},$$

continue production of the chemical compound with the selected reduced carbon emission reagent (box 1116) until a predetermined volume of production of the chemical compound is achieved (box 1120).

Otherwise (exit No from box 1112), the method verifies if all reagents have been already considered (box 1114). If yes (exit Yes from box 1114), the method chooses the best reagent providing maximum carbon emission reduction in the production of the chemical compound (box 1118), following by the production process in box 1116 and corresponding termination of the production upon achieving certain predetermined conditions (box 1120). If No (exit No from box 1114), the method returns back to the box 1106 for selecting the next reagent, and the method 1100 is repeated starting from the box 1106.

Thus, the method of production of the chemical compound and selection of the required reagent while meeting carbon emissions reductions, has been provided.

Thus, the additional embodiments of the invention describe the use the negative-emissions $H_2$, produced as described above, in the synthesis or refining of a variety of important chemical compounds such that the $CO_2$ emissions intensity of their production or use is significantly reduced.

These chemical compounds include, but are not limited to hydrocarbons, organic compounds, fertilizers (such as ammonia), foods, acids, reduced metals, peroxide and water.

Some examples are shown below, with R denoting an alkyl group.

Organic Synthesis:

$ROCH_2C_6H_5+H_2 \rightarrow ROH+CH_3C_6H_5$ (reaction 9)

$RCO_2R'+H_2 \rightarrow RCOH+R'OH$ (reaction 10)

$RNO_2+3H_2 \rightarrow RNH_2+2H_2O$ (reaction 11)

$RO+H_2 \rightarrow ROH_2$ (reaction 12)

Fertilizer: $N_2+3H_2 \rightarrow 2NH_3$ (ammonia production) (reaction 13)

Food: $RC\!\!=\!\!CR'+H_2 \rightarrow RCHCHR'$ (hydrogenation of margarine) (reaction 14)

Acid: $H_2+Cl_2 \rightarrow 2HCl$ (reaction 15)

Peroxide: $H_2+O_2 \rightarrow H_2O_2$ (reaction 16)

Water: $H_2+0.5O_2 \rightarrow H_2O$ (reaction 17)

Examples of $H_2$ use in refining where hydrogen is not added to the primary product or only some of the $H_2$ is added to the product include the following:

Metal oxide smelting: $Fe_3O_4+4H_2=3Fe°+4H_2O$ (reaction 18)

Oil Refining (Desulfurization):

$R\!\!-\!\!SH+H_2 \rightarrow R\!\!-\!\!H+H_2S$ (reaction 19)

$R\!\!-\!\!S\!\!-\!\!R'+2H_2 \rightarrow R\!\!-\!\!H+R'\!\!-\!\!H+H_2S$ (reaction 20)

$R\!\!-\!\!S\!\!-\!\!S\!\!-\!\!R'+3H_2 \rightarrow R\!\!-\!\!H+R'\!\!-\!\!H+2H_2S$ (reaction 21)

In these examples the reduction in product net $CO_2$ emissions is achieved by substituting positive-emissions $H_2$ with negative-emissions or neutral-emissions $H_2$ in the manufacture of the product. Thus, the total $CO_2$ emission associated with product manufacture is reduced or turned negative.

In the case of hydrocarbon fuels, the benefit of this method of reducing or reversing the carbon emissions intensity is that conventional fuel types, for example, jet fuel, gasoline, diesel, may continue to be used, thus avoiding more difficult or expensive transition to biologically derived hydrocarbon fuels or to non-hydrocarbon fuels such as to electricity, hydrogen gas, or ammonia.

However, to the extent that it is desirable to use $H_2$ or ammonia as fuel, their net $CO_2$ emissions can also be reduced or turned negative via the use of negative-emissions $H_2$ directly as a fuel, or as a hydrogen source in the synthesis of ammonia, for example:

$$H_2+O_2 \rightarrow H_2O+\text{energy} \quad \text{(reaction 22)}$$

$$3H_2+N_2 \rightarrow 2NH_3. \quad \text{(reaction 23)}$$

Figure 12:
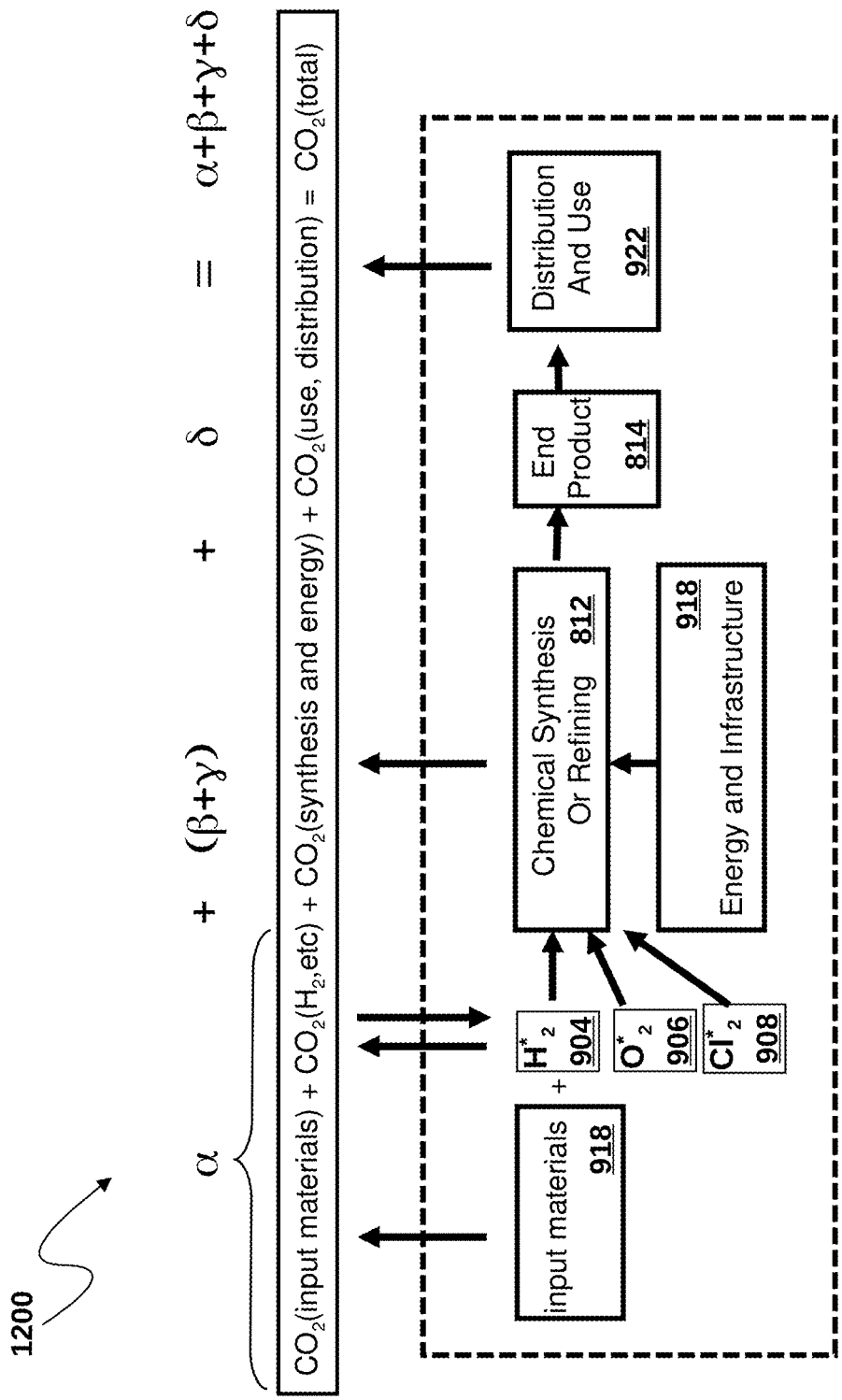
FIG. 12 illustrates the $CO_2$ emissions associated with synthesis, refining and use of a chemical compound and a method of calculating total $CO_2$ emissions.

FIG. 12 shows a diagram 1200 illustrating a method of quantifying the $CO_2$ emissions associated with the production and use of a chemical. Here the total $CO_2$ emissions of a chemical's production and use ($CO_2$(total)) is the sum of the emissions from: i) the extraction or production and delivery of the input materials ($CO_2$ (material)), ii) the production and delivery of the required $H_2$ ($CO_2(H_2)$), iii) the synthesis or refining process ($CO_2$ (synthesis)), and iv) the delivery and use of the product. The units of measure for each of these fluxes can be expressed in $CO_2$ mass units emitted per mass unit of product, for example kgs/kg or tonnes/tonne.

An example of the application of the method illustrated in FIG. 12 (also relating to FIGS. 8, 9, 10, 11) is the production of gasoline. Here, total emissions from the conventional production and use is assumed to be $CO_2$ (total)=4.0 kg $CO_2$ emissions/kg gasoline where:

$CO_2$(material)=0.2 kg $CO_2$ emissions/kg gasoline;

$CO_2(H_2)$=0.2 kg $CO_2$ emissions/kg gasoline;

$CO_2$(synthesis)=0.3 kg $CO_2$ emissions/kg gasoline; and $CO_2$(use)=3.3 kg $CO_2$ emissions/kg gasoline.

In this case, a conventional fossil-derived source of $H_2$ is used in the refining that has a positive $CO_2$ emissions ($CO_2(H_2)$>0). By substituting this source of $H_2$ with a negative-emissions source of $H_2$, $CO_2(H_2)$ then becomes −0.8 kg $CO_2$ emissions/kg gasoline, and $CO_2$ (total) then becomes 3.0 kg $CO_2$ emissions/kg gasoline, resulting in about 25% reduction in total $CO_2$ emissions of the gasoline.

Another example is the synthesis of methanol from air $CO_2$ and $H_2$.

Here the $CO_2$ (total) is assumed to equal 2 kg $CO_2$ emissions/kg $CH_3OH$ where:

$CO_2$(material)=0.25 kg $CO_2$ emissions/kg $CH_3OH$;

$CO_2(H_2)$=1.25 kg $CO_2$ emissions/kg $CH_3OH$;

$CO_2$(synthesis)=0.35 kg $CO_2$ emissions/kg $CH_3OH$; and $CO_2$(use)=0.15 kg $CO_2$ emissions/kg $CH_3OH$.

By substituting the above $CO_2$-emissions-positive $H_2$ with a negative-emissions source having a $CO_2(H_2)$ of −5.0 kgs/kg, the $CO_2$ (total) then becomes −4.25 kgs/kg, more than a 300% decrease in the total $CO_2$ emissions of the methanol.

In yet another example, the $CO_2$ (total) of reduced iron production via the use of conventionally-derived $H_2$ as a reductant is assumed to have a value of 1.5 kg $CO_2$ emissions/kg iron, where:

$CO_2$(material)=0.26 kg $CO_2$ emissions/kg iron;

$CO_2(H_2)$=0.44 kg $CO_2$ emissions/kg iron;

$CO_2$(synthesis)=0.7 kg $CO_2$ emissions/kg iron; and $CO_2$(use)=0.1 kg $CO_2$ emissions/kg iron.

Using negative-emissions $H_2$ as the $H_2$ source in the above process, the $CO_2(H_2)$ is reduced to −1.76 kg $CO_2$ emissions/kg iron, thus reducing $CO_2$ (total) to −0.26 kg $CO_2$ emissions/kg iron. That is, negative-emission iron has been produced.

Further embodiments of the invention are where $CO_2$ emissions associated with the production of certain materials or chemicals may also be reduced by the use of negative-emissions hydrogen or another reagent that is produced by methods other than those described above. These production methods may include various electrochemical approaches when powered by non-fossil-derived electricity, biomass gasification, pyrolysis or plasmolysis followed by carbon capture/immobilization and storage, and certain biomass fermentation processes followed by carbon capture/immobilization and storage.

In each case $CO_2$ removal from the atmosphere can be significantly greater than the other sources of $CO_2$ emitted to the atmosphere in the production of $H_2$, such that there is net atmospheric $CO_2$ removal, e.g., negative emissions. The use of such hydrogen in refining or synthesis of a chemical compound will reduce the net emissions of that compound, in some cases making it also a net negative-emissions product, using methods otherwise identical to those described in the preceding embodiment. In these cases the $CO_2$ emissions negativity ($CO_2(H_2)$ in FIGS. 9 and 10) will vary depending on the selection of a specific negative-emissions $H_2$ reagent production pathway used.

In a further embodiment of the invention, negative-emissions $O_2$ produced by the embodiments above has been used. This $O_2$ can be used in the synthesis, refining, oxidation or combustion of a variety of important chemical compounds, metals and fuels.

Examples include the following:

A. The smelting of iron ore into iron metal:

$$3C+1.5O_2 \rightarrow 3CO+Fe_2O_3 \rightarrow 2Fe°+3CO_2 \quad \text{(reaction 24)}$$

B. The production of ethylene oxide, a major precursor in the industrial production of certain agrochemicals, oilfield chemicals, detergents, textiles, and pharmaceuticals, for example:

$$2CH_2=CH_2+O_2 \rightarrow (Ag°) \rightarrow 2(CH_2CH_2)O \quad \text{(reaction 25)}$$

C. The production of acrylic acid from propylene:

$$2CH_2=CHCH_3+\_3O_2 \rightarrow 2CH_2=CHO_2H+2H_2O \quad \text{(reaction 26)}$$

D. The synthesis of water and hydrogen peroxide from oxygen:

$$H_2+0.5O_2 \rightarrow H_2O \quad \text{(reaction 27)}$$

$$H_2+O_2 \rightarrow H_2O_2 \quad \text{(reaction 28)}$$

E. The oxidation or partial oxidation (for example, oxycracking) of compounds for the generation of energy including for propulsion, transportation, welding, heat and electricity, or for the conversion or upgrading compounds, for example:

$$H_2 + 0.5O_2 \rightarrow H_2O + \text{energy} \quad \text{(reaction 29)}$$

$$CH_4 + 2O_2 \rightarrow CO_2 + 2H_2O + \text{energy} \quad \text{(reaction 30)}$$

$$\text{gasoline} + O_2 \rightarrow CO_2 + H_2O + \text{energy} \quad \text{(reaction 31)}$$

$$\text{diesel} + O_2 \rightarrow CO_2 + H_2O + \text{energy} \quad \text{(reaction 32)}$$

$$\text{jet fuel} + O_2 \rightarrow CO_2 + H_2O + \text{energy} \quad \text{(reaction 33)}$$

$$\text{coal} + O_2 \rightarrow CO_2 + H_2O + \text{energy} \quad \text{(reaction 34)}$$

$$\text{petcoke} + O_2 \rightarrow \text{valuable compounds} + CO_2 \quad \text{(reaction 35)}$$

As in the negative-emissions $H_2$ embodiments above, use of negative-emissions $O_2$ can therefore be used to reduce the net $CO_2$ emissions of the preceding production of materials or energy, the quantification of the $CO_2$ emissions reduction benefit being made via the calculation shown in FIG. 12.

As previously described above, some embodiments of the invention may generate $Cl_2$ rather than $O_2$ where the net $O_2$ emissions of its production is negative. By analogy with the preceding negative-emissions $H_2$ and $O_2$ examples, total $O_2$ emissions associated with the synthesis, refining and use of chemicals can be reduced if negative-emissions $Cl_2$ produced by the embodiments of the invention is used in said synthesis, refining and use of the chemical compound 814.

Examples include $$H_2O + Cl_2 \rightarrow HOCl + HCl \quad \text{(reaction 36)}$$

$$H_2 + Cl_2 \rightarrow 2HCl \quad \text{(reaction 37)}$$

$$\text{ethylene} + Cl_2 \rightarrow \text{ethyl chloride} \quad \text{(reaction 38)}$$

In summary, the embodiments of FIGS. 8-12 of the present invention related to the production of a chemical compound, illustrate a method for reducing $CO_2$ emissions to the atmosphere, comprising:
a production and use of a first chemical compound wherein a given amount of $CO_2$ is emitted in the production and the use;
producing a second chemical compound that is required for the production or the use of the first compound wherein the production of the second compound consumes $CO_2$ and sequesters it from the atmosphere so that the total net $CO_2$ emitted in the production and use of the first compound is now reduced.

The production and the use of the first chemical compound comprises synthesis, distribution and use of said first chemical compound. The production of the second compound consumes atmospheric $CO_2$ such that more $CO_2$ is consumed from the atmosphere than is emitted to the atmosphere in this production; the net $CO_2$ emitted in the production is a negative value.

The first chemical compound may be composed at least in part of one or more of the following: hydrogen atoms; oxygen atoms; chlorine atoms; a reduced metal. The first chemical compound may be selected from the group consisting of hydrocarbons, organic compounds, acids, ammonia, peroxide, and water. The first chemical compound may be obtained by a process selected from the group consisting of metal oxide smelting, oil refining, hydrogenation of margarine, and oxidation or partial oxidation of compounds.

The second chemical compound may be selected from the group consisting of $H_2$, $O_2$, and $Cl_2$.

In one embodiment, the second chemical compound is a gas produced in an electrochemical cell, wherein a metal hydroxide, co-formed in the process, is contacted and reacted with $CO_2$ to form metal bicarbonate, metal carbonate or both, thereby sequestering the $CO_2$ from the atmosphere. In the embodiment, the metal hydroxide contains metal ions from Group 1 through Group 6 elements of the periodic table. In this embodiment, the gas is hydrogen, oxygen or chlorine gas.

Also FIGS. 8-12 illustrate a system for reducing $CO_2$ emissions to the atmosphere, comprising:
means for production and use of a first chemical compound wherein a given amount of $CO_2$ is emitted in the production and the use;
means for production of a second chemical compound that is required for the production or the use of the first compound, wherein $CO_2$ is consumed and sequestered from the atmosphere during the production of the second chemical compound so that the total net $CO_2$ emitted in the production and use of the first compound is now reduced.

The system for the production and the use of the first chemical compound comprises means for synthesis, distribution and use of said first chemical compound. The production of the second compound consumes atmospheric $CO_2$ such that more $CO_2$ is consumed from the atmosphere than is emitted to the atmosphere in this production; the net $CO_2$ emitted in the production is a negative value.

In the system:
the first chemical compound may be composed at least in part of one or more of the following: hydrogen atoms; oxygen atoms; chlorine atoms; a reduced metal;
the first chemical compound may be selected from the group consisting of hydrocarbons, organic compounds, acids, ammonia, peroxide, and water;
the first chemical compound may be obtained by a process selected from the group consisting of metal oxide smelting, oil refining, hydrogenation of margarine, and oxidation or partial oxidation of compounds.

In the system, the second chemical compound may be selected from the group consisting of $H_2$, $O_2$, and $Cl_2$.

In one embodiment, system has means for producing the second chemical compound as a gas produced in an electrochemical cell, wherein a metal hydroxide, co-formed in the process, is contacted and reacted with $CO_2$ to form metal bicarbonate, metal carbonate or both, thereby sequestering the $CO_2$ from the atmosphere. In the system, the metal hydroxide contains metal ions from Group 1 through Group 6 elements of the periodic table. In the system, the gas is hydrogen, oxygen or chlorine gas.

In the above embodiments of the method and the system, the $CO_2$ is derived from one or more of the following: the atmosphere; biomass, soil or the ocean; a fossil source of the $CO_2$.

Also another method for reducing total $CO_2$ emissions in the production and use of a chemical compound has been provided as described in detail above, wherein the production and use in sum emits $CO_2$ to the atmosphere and requires the use of a gas in the production, the method including:
the method of generating said negative-$CO_2$-emissions gas comprising:
(a) supplying a direct current from an electrical source, preferably a low- or zero-$CO_2$ emitting source, at a predetermined voltage to an electrolytic container having an anode, a cathode, an electrolyte solution comprising a metal salt, an anode region adapted to generate an oxidative gas and an acidic solution, and a cathode region adapted to generate hydrogen gas and a dissolved metal hydroxide solution, the metal in said dissolved metal hydroxide solution being derived from the metal salt comprising the electrolyte solution;

(b) supplying, from a source disposed externally to the electrolytic container, a metal silicate soluble in the acidic solution;

(c) removing the acidic solution from the anode region to another container outside the electrolytic container, for reacting the removed acidic solution with the metal silicate to generate a metal salt solution, wherein the metal is derived from the metal silicate;

(d) reacting the metal salt solution from the step (c) with the dissolved metal hydroxide solution of the step (a) to produce a reaction solution and generate a second metal hydroxide, wherein the metal in said second metal hydroxide is derived from the metal silicate;

(e) separating said second metal hydroxide from the remaining reaction solution in the step (d);

(f) exposing said metal hydroxide produced in step (e) to $CO_2$ from air or $CO_2$ derived from air, causing a reaction with the $CO_2$ to form metal bicarbonate, metal carbonate, or both, thereby removing and sequestering the $CO_2$ from the atmosphere in an amount that is greater than sum of any $CO_2$ emitted by the generation of the oxidative and hydrogen gases, thus producing a negative-$CO_2$-emissions form of those gases.

Thus, the reducing total $CO_2$ emissions is achieved by using a negative-$CO_2$-emissions gas in the production and use of the chemical compound, wherein generation of the negative-$CO_2$-emissions gas in net consumes more $CO_2$ from the atmosphere than is emitted to the atmosphere.

In the method described above, the first metal hydroxide is NaOH or KOH, and the said second metal hydroxide is $Mg(OH)_2$ or $Ca(OH)_2$. In the method, the gas used in said production and use of a chemical compound is hydrogen, oxygen or chlorine gas. In the method, the chemical compound is a hydrocarbon, organic compound, acid, ammonia, peroxide, or water. In the method, said reducing total $CO_2$ emissions in the production and use of a chemical compound is achieved by deducting i) the negative $CO_2$ emissions of the gas or gases used in said production and use from ii) the $CO_2$ otherwise emitted from said production and use in the absence of the invention.

The foregoing has constituted a description of specific embodiments showing how the invention may be applied and put into use. These embodiments are only exemplary. The invention in its broadest, and more specific aspects, is further described and defined in the claims which now follow.

What is claimed is:

1. A method for reducing $CO_2$ emission in a production and use of a chemical compound using a gas as a reagent, the gas comprising at least one of oxygen gas and hydrogen gas, during which a predetermined amount of $CO_2$ is emitted to the atmosphere, the method comprising:

substituting the gas with a negative-$CO_2$-emission gas for reducing the predetermined amount of $CO_2$ emission;

producing the negative-$CO_2$-emission gas in an electrochemical cell, having an anode, a cathode, an electrolyte solution containing magnesium salt solution, generating an acidic solution and the oxygen gas at the anode, and magnesium hydroxide solution and the hydrogen gas at the cathode;

in another container:

(i) supplying the acidic solution removed at the anode;

(ii) supplying, from a source disposed externally to the electrolytic container, a metal silicate mass soluble in the acidic solution, the metal silicate mass comprising 38% of magnesium oxide;

(iii) irrigating said metal silicate mass with the removed acidic solution at an irrigation rate from 0.08 to 0.4 liters per minute per square meter of the metal silicate mass to generate water and magnesium salt solution;

(iv) supplying the magnesium salt solution to the electrochemical cell as the electrolyte solution; and reacting magnesium hydroxide derived from the magnesium hydroxide solution removed at the cathode with carbon dioxide to form one or more of the metal bicarbonate and the metal carbonate, thereby sequestering the carbon dioxide from the atmosphere and producing the negative-$CO_2$-emission gas.

2. The method of claim 1, wherein the gas further comprises chlorine gas.

3. The method of claim 1, wherein the chemical compound is one of:

a chemical compound containing hydrogen atoms;

a chemical compound containing oxygen atoms;

a chemical compound containing chlorine atoms;

a chemical compound containing a reduced metal.

4. The method of claim 1, wherein the chemical compound is selected from the group consisting of hydrocarbons, organic compounds, acids, ammonia, peroxide, and water.

5. The method of claim 1, wherein the chemical compound is obtained by a process selected from the group consisting of metal oxide smelting, oil refining, hydrogenation of margarine, and oxidation or partial oxidation of compounds.

6. The method of claim 1, wherein the carbon dioxide is derived from one or more of the following:

the atmosphere;

biomass, soil or the ocean;

a fossil source of the carbon dioxide.

7. The method of claim 1, further comprising setting a mass ratio of the removed acidic solution and the metal silicate mass within a range from 2:1 to 6:1.

8. The method of claim 1, wherein the step (iii) comprises irrigating at the irrigation rate from 0.12 to 0.28 liters per minute per square meter of the metal silicate mass.

9. The method of claim 1, wherein the producing the negative-$CO_2$-emission gas further comprises removing the acidic solution at the anode and adding de-ionized water at the anode at such rates that a concentration of the removed acidic solution is >7 wt %, corresponding to pH<3.

10. The method of claim 1, wherein the producing the negative-$CO_2$-emission gas further comprises removing a portion of the metal hydroxide solution at the cathode, wherein a removal rate is such that at least about 10 wt %, corresponding to pH>12, of the metal hydroxide solution is removed.

11. The method of claim 1, wherein the reacting further comprising dissolving the magnesium hydroxide and adding the dissolved magnesium hydroxide to a water body in a concentration that effects a water body pH of <9.

12. The method of claim 1, wherein the acidic solution is sulfuric acid solution, and the magnesium salt is magnesium sulfate.

13. The method of claim 12, wherein a molar ratio of the sulfuric acid supplied in the step (i) versus the magnesium sulfate formed in the step (iii) ranges from 0.35 to 0.95.

14. The method of claim 1, further comprising supplying said water generated in the step (iii) back to the electrochemical cell, thereby regenerating water in the electrolyte solution of the electrochemical cell.

15. A method for reducing total $CO_2$ emissions in a production and use of a chemical compound using a gas as a reagent, wherein a predetermined amount of $CO_2$ is emitted to the atmosphere during the production and the use, the method comprising:
- substituting the gas with a negative-$CO_2$-emission gas for reducing the predetermined amount of $CO_2$ emissions, comprising producing the negative-$CO_2$-emission gas, comprising:
  - (a) supplying a direct current from an electrical source at a predetermined voltage to an electrolytic container having an anode, a cathode, an electrolyte solution containing a monovalent metal salt, an anode region adapted to generate an oxidative gas and an acidic solution, and a cathode region adapted to generate hydrogen gas and a dissolved metal hydroxide solution, the metal in said dissolved metal hydroxide solution being derived from the metal salt of the electrolyte solution;
- in another container:
  - (i) supplying the acidic solution removed at the anode;
  - (ii) supplying, from a source disposed externally to the electrolytic container, a metal silicate soluble in the acidic solution, the metal silicate mass comprising 38% of magnesium hydroxide;
  - (iii) irrigating said metal silicate mass with the removed acidic solution at an irrigation rate from 0.08 to 0.4 liters per minute per square meter of the metal silicate mass to generate water and magnesium salt solution;
- (b) reacting the magnesium salt solution from the step (iii) with the dissolved metal hydroxide solution of the step (a) to produce a reaction solution and generate magnesium hydroxide;
- (c) separating the magnesium hydroxide from the remaining reaction solution in the step (d); and
- (d) exposing said magnesium hydroxide to carbon dioxide from air causing a reaction with the carbon dioxide to form one or more of the metal bicarbonate and the metal carbonate, thereby removing and sequestering the carbon dioxide from the atmosphere and producing the negative-$CO_2$-emission gas.

16. The method of claim 15, wherein the metal hydroxide is NaOH or KOH.

17. The method in claim 15 wherein the gas used in said production and use of a chemical compound is hydrogen, oxygen or chlorine gas.

18. The method of claim 15 wherein said chemical compound is a hydrocarbon, organic compound, acid, ammonia, peroxide, or water.

19. The method of claim 15, further comprising setting a mass ratio of the removed acidic solution and the metal silicate mass within a range from 2:1 to 6:1.

20. The method of claim 15, wherein the step (iii) comprises irrigating at the irrigation rate from 0.12 to 0.28 liters per minute per square meter of the metal silicate mass.

* * * * *